United States Patent
Namihira

(10) Patent No.: US 10,044,558 B2
(45) Date of Patent: *Aug. 7, 2018

(54) SWITCH AND SETTING METHOD

(71) Applicant: FUJITSU LIMITED, Kawasaki-shi, Kanagawa (JP)

(72) Inventor: Daisuke Namihira, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 346 days.

This patent is subject to a terminal disclaimer.

(21) Appl. No.: 14/840,451

(22) Filed: Aug. 31, 2015

(65) Prior Publication Data

US 2015/0372862 A1     Dec. 24, 2015

Related U.S. Application Data

(63) Continuation of application No. PCT/JP2013/057816, filed on Mar. 19, 2013.

(51) Int. Cl.
*H04L 12/28* (2006.01)
*H04L 12/24* (2006.01)
(Continued)

(52) U.S. Cl.
CPC ...... *H04L 41/0806* (2013.01); *G06F 9/45558* (2013.01); *H04L 12/44* (2013.01);
(Continued)

(58) Field of Classification Search
None
See application file for complete search history.

(56) References Cited

U.S. PATENT DOCUMENTS 9,515,846 B2 * 12/2016 Namihira ............ H04L 12/4641
9,628,410 B2 *  4/2017 Namihira ............ H04L 49/356
(Continued)

FOREIGN PATENT DOCUMENTS

DE   102011080676 A1   2/2013
EP        1394998 A2   3/2004
(Continued)

OTHER PUBLICATIONS

International Search Report, mailed in connection with PCT/JP2013/057816 dated Jun. 18, 2013.
(Continued)

*Primary Examiner* — Willie J Daniel, Jr.
(74) *Attorney, Agent, or Firm* — Fujitsu Patent Center

(57) ABSTRACT

A disclosed switch includes: plural ports; a first unit that applies profile associated with identification data to a port of the plural ports, upon receiving a message, which includes the identification data of profile relating to the another apparatus, through a first link in a situation that another apparatus connected to the port through the first link is connected to another switch through a second link and the first and second link are virtually integrated; a second unit that generates information including a first identifier of the profile and a second identifier of the first and second links virtually integrated, and transmits the information to the another switch, upon receiving the message; and a third unit that applies profile associated with a third identifier to the port when that profile has not been applied, upon receiving the third identifier of the profile and the second identifier from the another switch.

7 Claims, 19 Drawing Sheets

(51) Int. Cl.
    *H04L 12/44*         (2006.01)
    *G06F 9/455*         (2018.01)
    *H04L 12/933*       (2013.01)
    *H04L 12/935*       (2013.01)
    *H04L 12/931*       (2013.01)
    *H04L 12/709*       (2013.01)

(52) U.S. Cl.
    CPC .............. *H04L 49/15* (2013.01); *H04L 49/30* (2013.01); *H04L 49/354* (2013.01); *H04L 49/70* (2013.01); *G06F 2009/4557* (2013.01); *G06F 2009/45595* (2013.01); *H04L 45/245* (2013.01)

(56) References Cited

U.S. PATENT DOCUMENTS

| | | | |
|---|---|---|---|
| 9,742,698 B2 * | 8/2017 | Namihira | ............ H04L 43/0811 |
| 2009/0240790 A1 | 9/2009 | Utsunomiya et al. | |
| 2010/0040068 A1 | 2/2010 | Wimmer | |
| 2011/0238820 A1 | 9/2011 | Matsuoka | |
| 2012/0051364 A1 | 3/2012 | Fujita et al. | |
| 2012/0128005 A1 | 5/2012 | Tatsumi et al. | |
| 2012/0278807 A1 | 11/2012 | Nakagawa | |
| 2013/0298126 A1 | 11/2013 | Nakagawa | |
| 2014/0064056 A1 | 3/2014 | Sakata et al. | |
| 2014/0169379 A1 | 6/2014 | Hyoudou et al. | |

FOREIGN PATENT DOCUMENTS

| | | |
|---|---|---|
| JP | 09-284328 A | 10/1997 |
| JP | 9-284329 A | 10/1997 |
| JP | 2002-135282 A | 5/2002 |
| JP | 2005-286483 A | 10/2005 |
| JP | 2006-80622 A | 3/2006 |
| JP | 2012-054731 | 3/2012 |
| JP | 2012-114644 | 6/2012 |
| JP | 2014-120911 | 6/2014 |
| WO | 2011/087122 | 7/2011 |
| WO | 2012/093495 | 7/2012 |
| WO | 2012/120557 | 9/2012 |

OTHER PUBLICATIONS

Clark, Christopher et al., "Live Migration of Virtual Machines", Proceedings of the 2nd USENIX Symposium on Networked Systems Design and Implementation (NSDI'05), Boston, MA, USA, May 2, 2005, pp. 273-286, Retrieved from the Internet: URL: https://www.usenix.org/legacy/event/nsdi05/tech/full_papers/clark/clark.pdf, [Retrieved on Feb. 7, 2014].
Extended European Search Report dated Feb. 3, 2016 for corresponding European Patent Application No. 13879109.0, 5 pages.
International Search Report of PCT/JP2013/054162 dated Mar. 26, 2013, 1 page.
Extended European Search Report from EPO Application No. 13875498.1 dated Jan. 26, 2016, 7 pages.

* cited by examiner

| PORT NUMBER | PORT TYPE | MLAG CHANNEL NUMBER |
|---|---|---|
| 1 | OUTER PORT | 1 |
| 2 | OUTER PORT | 1 |
| 3 | INNER PORT | 2 |
| 4 | INNER PORT | 2 |

| PROFILE IDENTIFIER | PORT PROFILE | APPLICATION DESTINATION TENANT ID | APPLICATION TO PORT | DELETION TIMER |
|---|---|---|---|---|
| aaa | ppp | 1 | × | |
| bbb | qqq | 1 | × | |
| ⋮ | ⋮ | ⋮ | ⋮ | |
| nnn | zzz | 10 | × | |

FIG.7

| PROFILE IDENTIFIER | PROFILE ID | APPLICATION DESTINATION TENANT ID | APPLICATION TO PORT | DELETION TIMER |
|---|---|---|---|---|
| aaa | 1 | 1 | × | |
| bbb | 2 | 1 | × | |
| ⋮ | ⋮ | ⋮ | ⋮ | |
| nnn | 1 | 5 | × | |

FIG.8

| PROFILE ID | PORT PROFILE |
|---|---|
| 1 | ppp |
| 2 | qqq |
| ⋮ | ⋮ |
| 100 | zzz |

FIG.9

SWITCH AND SETTING METHOD

CROSS-REFERENCE TO RELATED APPLICATIONS

This application is a continuation application, filed under 35 U.S.C. section 111(a), of International Application PCT/JP2013/057816, filed on Mar. 19, 2013, the entire contents of which are incorporated herein by reference.

FIELD

This technique relates to a technique for setting switches automatically.

BACKGROUND

Recently, a virtualization technique to cause a virtual computer called a virtual machine (VM: Virtual Machine) to operate on a physical server has been used. As one of functions in this virtualizing technique, there is Live Migration to cause a VM operating on a certain physical server to migrate to another physical server without stopping applications. This Live Migration function is used in a cloud or a data center environment, in which free migration of VMs are expected.

When a VM is migrated by Live Migration, a port profile for the VM which is a migration target is also migrated in accordance with the migration of the VM. This port profile includes information on VLAN (Virtual LAN (Local Area Network)), QoS (Quality of Service), and the like. There is a protocol defined by IEEE802.1Qbg as a method to notify a switch side of the migration of this port profile and to automatically change a definition of a network environment in accordance with the migration of the VM.

IEEE802.1Qbg defines a protocol called VDP (VSI (Virtual Station Interface) Discovery and Configuration Protocol). A notification (DE-ASSOC message) to notify deletion of a profile due to disappearance of a VM from an interface of a migration source server of the VM, a notification (ASSOC message) to notify registration of the profile due to activation of the VM from an interface of a migration destination server of the VM, and the like are defined. Then, a database for the profile is kept in a switch, and when these messages are received in the switch side, application of the profile or the like is automatically performed according to the messages.

Moreover, as expansion of VDP, there is a technique to handle a case of cascaded switches as illustrated in FIG. 1 by performing processing as illustrated in FIGS. 2 and 3.

A system illustrated in FIG. 1 includes a blade server 10, a blade server 40, an external switch 60, and a port profile DB (database) server 5.

The port profile DB server 5 stores system requirements for VMs in association with VMs operating on each blade server. For example, the port profile DB server 5 stores information on a VLAN, QoS, bandwidth that has been allocated and the like for a VM.

The blade server 10 and the blade server 40 are servers that mount plural servers in their housing, which are called "Blade" and are capable of being inserted and being removed. For example, as illustrated in FIG. 1, the blade server 10 includes CPU (Central Processing Unit) servers 11 to 13 and a switch blade 20, and the blade server 40 includes CPU servers 41 and 42 and a switch blade 50.

A CPU server which each blade server includes is a server capable of being inserted and being removed as described above, and causes a VM to operate by executing a VMM (Virtual Machine Monitor) called hypervisor. For example, each CPU server exchanges data among other CPU servers and other VMs by causing a VM and a virtual switch to operate by the VMM. In FIG. 1, as one example, VMs 1 and 2 operate on the CPU server 11 included in the blade server 10, VMs 3 and 4 operate on the CPU server 12 included in the blade server 10, VMs 5 and 6 operate on the CPU server 13 included in the blade server 10. Moreover, VM 8 operates on the CPU server 41 included in the blade server 40, and VM 9 operates on the CPU server 42 included in the blade server 40.

A switch blade that each blade server has controls communication inside a blade server and communication between blade servers by using techniques such as Ethernet (registered trademark) and Fibre Channel. For example, the switch blade 20 relays data exchanged between the VM 1 on the CPU server 11 and the VM 5 on the CPU server 13, and controls communication inside a blade server. Moreover, the switch blades 20 and 50 relay data exchanged between the VM 3 on the CPU server 12 and the VM 8 on the CPU server 41 through the external switch 60, and control communication between blade servers.

The external switch 60 is connected to a switch blade in each blade server, and is a data relay apparatus such as a layer 2 switch that controls communication between blade servers. For example, the external switch 60 has the same function as the switch blades 20 and 50, and relays data exchanged between the switch blades 20 and 50.

Next, by using FIGS. 2 and 3, processing performed when the VM 2 on the CPU server 11 migrates to the CPU server 41 will be explained. In other words, the CPU server 11 is considered as a migration source server, and the CPU server 41 is considered as a migration destination server. Moreover, a migration source switch blade is considered as the switch blade 20 in the same blade server as the CPU server 11, and a migration destination switch blade is considered as the switch blade 50 in the same blade server as the CPU server 41.

In such a state, as illustrated in FIG. 2, when the VMM on the CPU server 41 accepts an instruction operation from an administrator or the like, it generates a new VM on the own server (S101). Next, when the VMM on the CPU server 11 accepts a live migration instruction from a management terminal or the like (S102), it performs pre-copy in a state that a migration target VM is operating on the own server (S103 and S104).

When pre-copy starts, the VMM on the CPU server 41 transmits a PRE-ASSOC message of VDP to the switch-blade 50 (S105). The switch blade 50 determines that the VM migrates over blade servers based on a VSIID (an ID of the VSI) included in the received PRE-ASSOC message, and transfers the received PRE-ASSOC message to the external switch 60 (S106).

The external switch 60 which is a transfer destination of the message obtains a port profile corresponding to the VSIID included in the PRE-ASSOC message from the port profile DB server 5, and stores it in a port profile table (S107). Then, the external switch 60 transmits a PRE-ASSOC CONF message to the switch blade 50 as a response to the PRE-ASSOC message (S108). Then, the switch blade 50 transfers the PRE-ASSOC CONF message received from the external switch 60 to the CPU server 41 which is a transmission source of the PRE-ASSOC message (S109).

Later, when an amount of change of a memory is equal to or less than a predetermined value, the VMM on the CPU server 41 performs stop and copy (S110 and S111).

Shifting to the explanation of the processing in FIG. 3, when stop and copy starts, the VMM on the CPU server 41 transmits an ASSOC message of VDP to the switch blade 50 (S112). The switch blade 50 determines that the VM migrates over blade servers based on a VSIID included in the received ASSOC message, and transfers the received ASSOC message to the external switch 60 (S113).

The external switch 60 which is a transfer destination of the message updates a VSI table corresponding to the VSIID included in the ASSOC message, and applies a port profile (S114). Then, the external switch 60 transmits an ASSOC CONF message to the switch blade 50 as a response to the ASSOC message (S115). Then, the switchblade 50 transfers the ASSOC CONF message received from the external switch 60 to the CPU server 41 which is a transmission source of the ASSOC message (S116).

On the other hand, the VMM on the CPU server 11 transmits a DE-ASSOC message of VDP to the switch blade 20 (S117). The switch blade 20 determines that the VM migrates over blade servers based on a VSIID included in the received DE-ASSOC message, and transfers the received DE-ASSOC message to the external switch 60 (S118).

The external switch 60 which is a transfer destination of the message identifies a port profile corresponding to the VSIID included in the DE-ASSOC message from the VSI table, and deletes the identified port profile (S119). Then, the external switch 60 transmits a DE-ASSOC CONF message to the switch blade 20 as a response to the DE-ASSOC message (S120).

Then, the switch blade 20 transfers the DE-ASSOC CONF message received from the external switch 60 to the CPU server 11 which is a transmission source of the DE-ASSOC message (S121).

However, there are plural network interfaces on a physical server, and there's a case where their links are set as LAG (Link Aggregation) and are dispersedly used. In other words, when the physical server side is set as LAG, a physical line among the ports set as LAG is selected and the frame of VDP is outputted only to the line because the plural set ports are treated as one logical port and a frame of VDP is transmitted to the logical port.

When LAG is used in the physical server side, it does not matter when the number of switches which are connection destinations is 1. However, there is a case where each physical link is connected to a different switch from the view for redundancy, and the lines are sometimes set as MLAG (Multi-chassis Link Aggregation) in the switch side. It is impossible for the aforementioned technique to handle a case that such MLAG has been set.

Patent Document 1: International Publication Pamphlet No. WO 2012/093495

SUMMARY

A switch relating to this technique includes: plural ports; a first application unit that applies profile data associated with identification data to a first port of the plural ports, upon receiving a predetermined message through a first link in a situation that another apparatus connected to the first port through the first link is connected to another switch through a second link and the first link and the second link are virtually integrated, wherein the predetermined message includes the identification data of profile data relating to the another apparatus; a notification unit that generates a first registration notification that includes a first identifier of the profile data and a second identifier for identifying the first link and the second link which are virtually integrated, and transmits the first registration notification to at least the another switch, upon receiving the predetermined message; and a second application unit that applies profile data associated with a third identifier to the first port when the profile data associated with the third identifier has not been applied to the first port, upon receiving a second registration notification, which includes the third identifier of the profile data and the second identifier for identifying the first link and the second link which are virtually integrated, from the another switch.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of a profile table;

FIG. 8 is a diagram depicting another example of the profile table;

FIG. 9 is a diagram depicting another example of the profile table;

FIG. 11 is a diagram depicting an example of a TLV format of an ASSOC message or the like;

DESCRIPTION OF EMBODIMENTS

Figure 1:
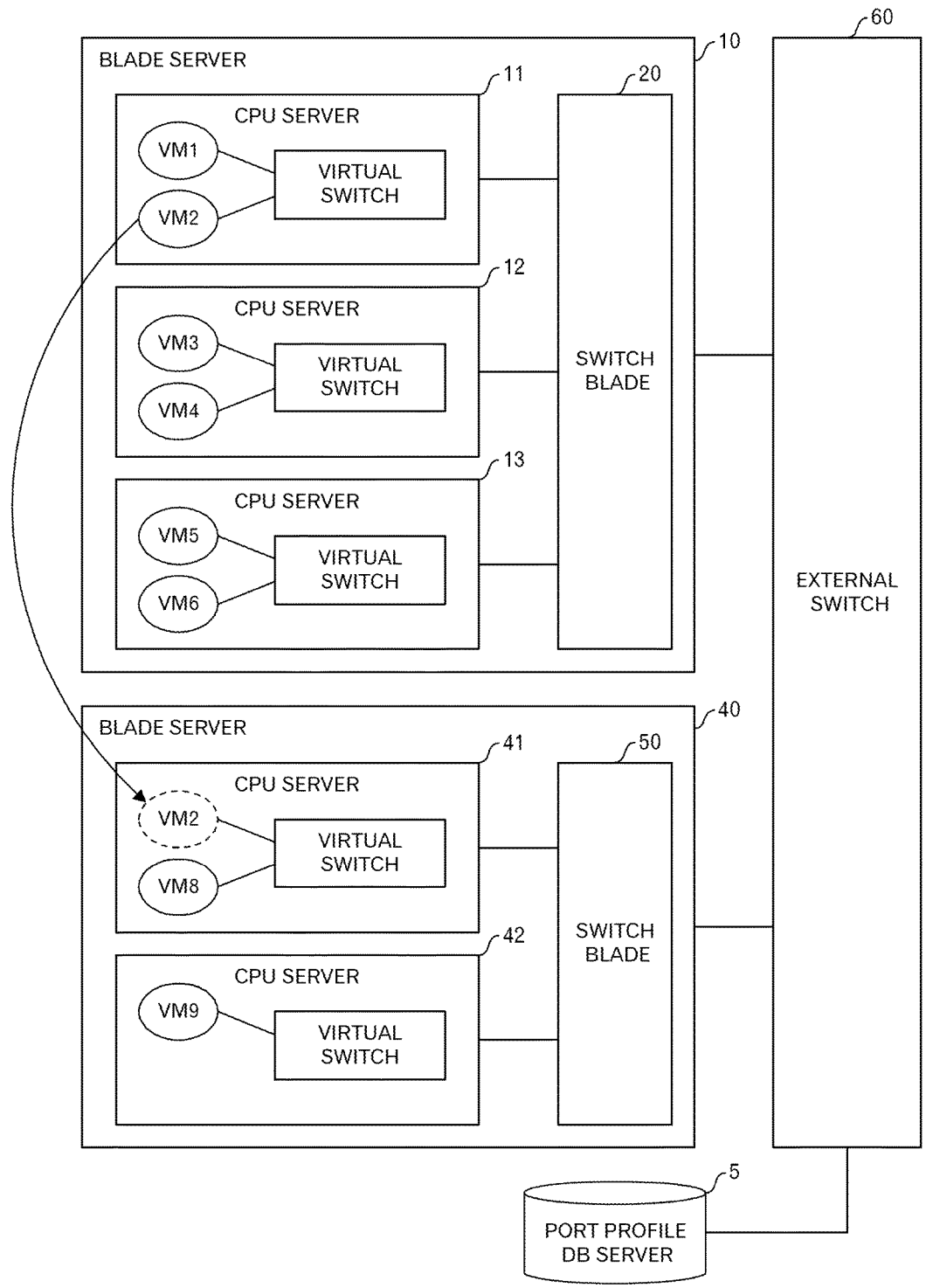
FIG. 1 is a diagram for explaining an example of network configuration in a conventional technique.

An example of a network relating to this embodiment will be explained by using FIG. 4. In this embodiment, a network including switches 1 to 6 is set up between a core network and external apparatuses such as servers and storage devices. The switches 1 and 2 include a port connected to the core network (hereinafter referred to as Network Port) and a port connected to other switches (hereinafter referred to as Inner Port). On the other hand, the switches 3 to 6 include a port connected to the external apparatuses such as servers (hereinafter referred to as Outer Port) and inner ports connected to other switches.

A server A is connected to the switches 3 and 4, and a link between the server A and the switch 3 and a link between the server A and the switch 4 are set as MLAG. In other words, these links are virtually integrated, and it seems that one logical link exists when they are seen from the server A. Similarly, a server B is also connected to the switches 3 and 4, and a link between the server B and the switch 3 and a link between the server B and the switch 4 are set as MLAG. In other words, these links are virtually integrated, and it seems that one logical link exists when they are seen from the server B.

Furthermore, a server C is connected to the switches 5 and 6, and a link between the server C and the switch 5 and a link between the server C and the switch 6 are set as MLAG. In other words, these links are virtually integrated, and it seems that one logical link exists when they are seen from the server C. Similarly, a server D is also connected to the switches 5 and 6, and a link between the server D and the switch 5 and a link between the server D and the switch 6 are set as MLAG. In other words, these links are virtually integrated, and it seems that one logical link exists when they are seen from the server D.

The switch 3 is connected to the switches 1 and 2, the switch 4 is also connected to the switches 1 and 2, and links between these switches are also set as MLAG. Similarly, the switch 5 is connected to the switches 1 and 2, the switch 6 is connected to the switches 1 and 2, and links between these switches are also set as MLAG.

Figure 2:
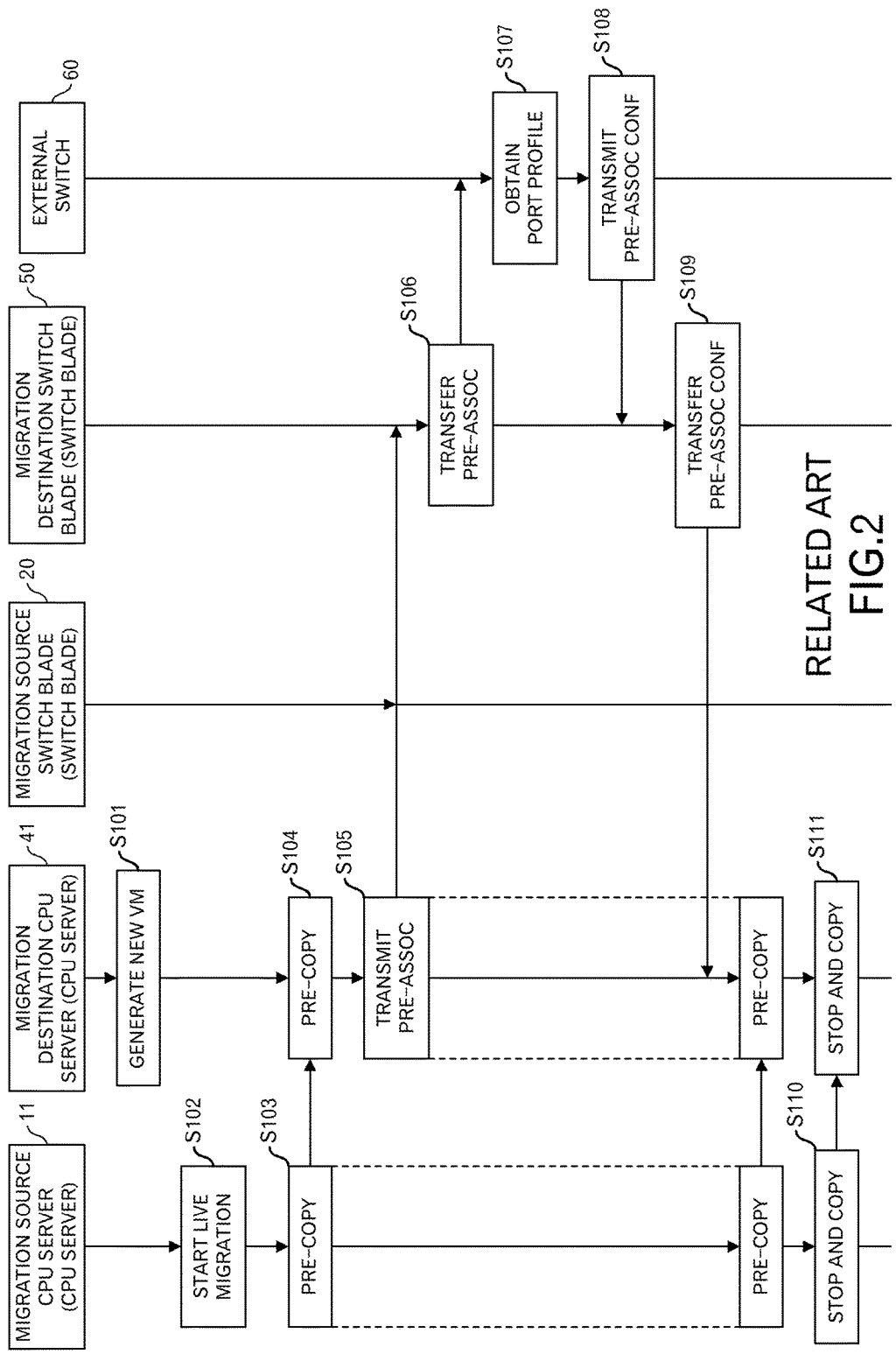
FIG. 2 is a diagram depicting a processing flow in a conventional technique.
Figure 3:
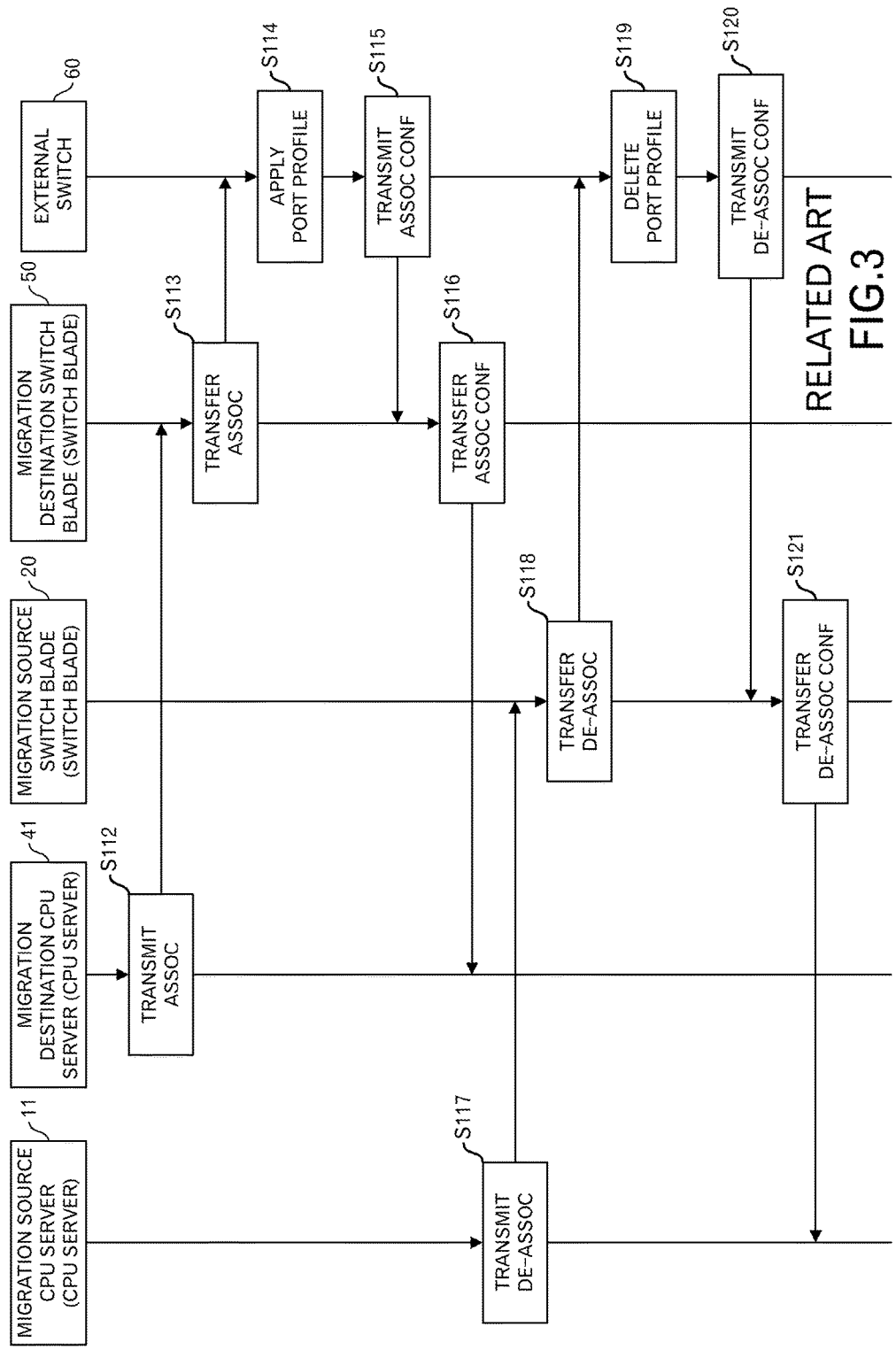
FIG. 3 is a diagram depicting the processing flow in the conventional technique.

In such a network, for example, when a VM on the server A performs live migration to the server D, the server D which is a migration destination outputs a PRE-ASSOC message and an ASSOC message in VDP to the switches 5 and 6 connected to the server D similarly to the processing flow illustrated in FIGS. 2 and 3. Furthermore, the server A which is a migration source outputs a DE-ASSOC message to the switches 3 and 4 connected to the server A.

Because a message as described above is outputted only to one of links when the links are set as MLAG in this way, application and release of application of a port profile for a switch to which the residual links are connected are not properly performed in a conventional method.

Therefore, a switch which has configuration as explained below is adopted in this embodiment.

Figures 5, 6:
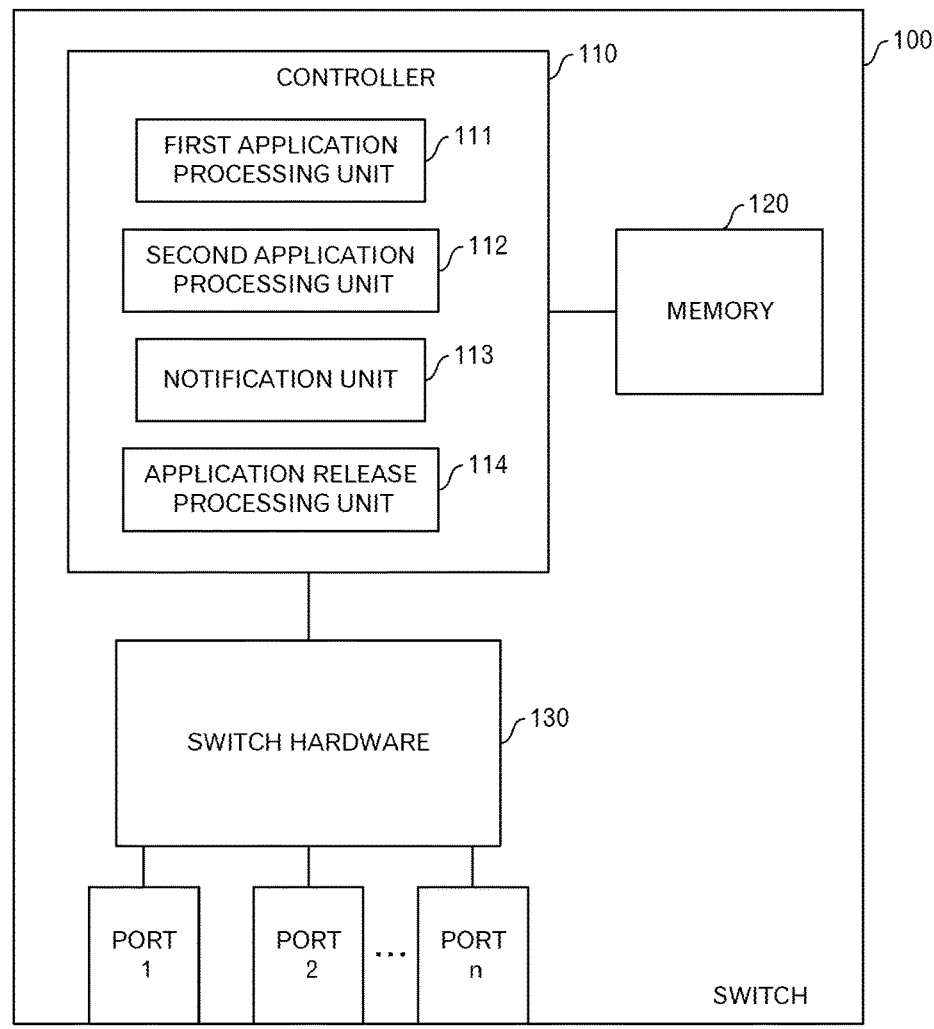
FIG. 5 is a functional diagram of a switch.
FIG. 6 is a diagram depicting an example of aport setting table.

Next, FIG. 5 illustrates a functional block diagram of a switch relating to this embodiment. A switch 100 includes a controller 110, a memory 120, a switch hardware 130, and ports 1 to n. The controller 110 controls the whole of the switch 100 including the switch hardware 130, and includes a first application processing unit 111, and a second application processing unit 112 that apply a port profile to a port, a notification unit 113 that transmits a registration notification described below to other switches, and an application release processing unit 114 that releases the application of the port profile for the port. The controller 110 is realized by, for example, a combination of a processor and programs. In this case, by executing the programs stored in the memory 120 or other ROM (Read Only Memories) by the processor, the controller 110 is realized. The memory 120 stores data used for processing executed by the controller 110.

The switch hardware 130 is a semiconductor apparatus that relays frames exchanged among ports. The switch 100 is a switch that can use plural lines as redundant routes by logically integrating the same kind of plural switches into one switch and exchanging conditions inside. In this case, the switch hardware 130 has a function that communicates with other switches by an original format of the switch hardware 130. The ports 1 to n are connected with cables that connect other switches, external networks, servers, and the like.

Moreover, a port setting table and a profile table are stored in the memory 120. FIG. 6 illustrates an example of the port setting table. In the example of FIG. 6, a port type and a MLAG channel number are set for each port. As described above, a port type is set as Inner Port, Outer Port, or Network Port. As for the MLAG channel number, the same MLAG channel number is set for ports connected to links set as MLAG.

Moreover, FIG. 7 illustrates an example of a profile table. In the example of FIG. 7, a profile identifier, a port profile, an application destination tenant ID, presence or absence of port application, and a deletion timer are registered for each port profile. In the case of VDP, the profile identifier is a VSI TYPE ID or VSIID format+VSIID, and these are described later. Moreover, a port profile includes a list of VLANID, QoS, ACL (Access Control List) data, and other data. The QoS includes a definition of a bandwidth limit and priority for a target frame of the port profile. The ACL data is used to interrupt a specific frame transmitted to a VM executed in a server, and includes a definition to change a region in which priority of the frame is described. A CoS (Class of Service) field in a VLAN tag and a DSCP (Differentiated Services Code Point. ToS: Type of Service) in an IP header correspond to the region in which the priority of the frame is described. There are operations to change a ToS region and a CoS region in the specific frame into specified values and to copy contents of the ToS to the CoS.

When there are plural tenants in which VMs are executed, the application destination tenant ID is used to distinguish port profiles. As for the presence or absence of port application, in the processing described below, when a port profile is applied to a port, the port application is present, and when release of application of port profiles is performed for each port, the port application is absent. A port number of an application destination may be registered.

As for the port profile table, configuration as FIGS. 8 and 9 may be adopted. In other words, a profile identifier, a profile ID, an application destination tenant ID, presence or absence of port application, and a deletion timer are registered. Then, as illustrated in FIG. 9, the port profile is registered in association with the profile ID.

Next, as for application of a port profile, operation of a switch will be explained by using FIGS. 10 to 13. Settings concerning all VLANs are performed in advance for ports whose port type is Inner Port. Thus, if application of a port profile and release of application are properly performed by focusing only on outer ports, passage and discard of a frame are properly controlled in outer ports even in a network which includes cascaded switches for which MLAG as illustrated in FIG. 4 is set.

Figure 10:
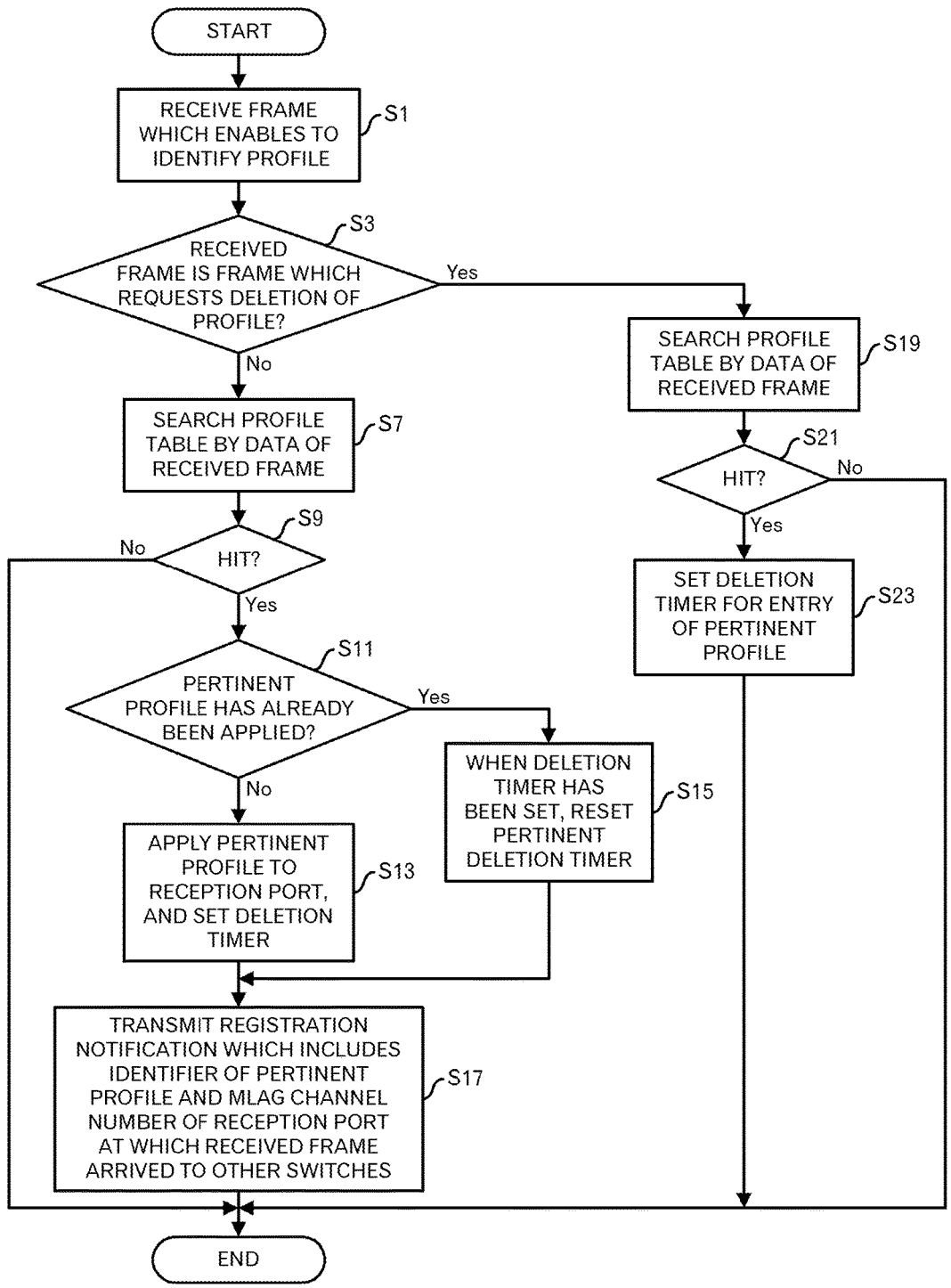
FIG. 10 is a diagram depicting a processing flow when using VDP.

First, the first application processing unit 111 included in the controller 110 receives a frame which enables to identify a profile through one of ports and the switch hardware 130 (FIG. 10: step S1).

Here, a frame which enables to identify a profile is a PRE-ASSOC (formally, Pre-Associate) message, a PRE-ASSOC with resource reservation message, an ASSOC (formally, Associate) message, or a DE-ASSOC (formally, De-Associate) message in VDP. The ASSOC message is transmitted in response to a boot of a VM, but later the ASSOC message may be regularly transmitted as a confirmation message of existence (Keep-Alive). The PRE-ASSOC message and the PRE-ASSOC with resource reservation message are transmitted at the step prior to the step in which the ASSOC message is transmitted, and do not have a message corresponding to Keep-Alive, but the ASSOC message is transmitted in response to activation of the VM, which is performed later.

Figure 11:
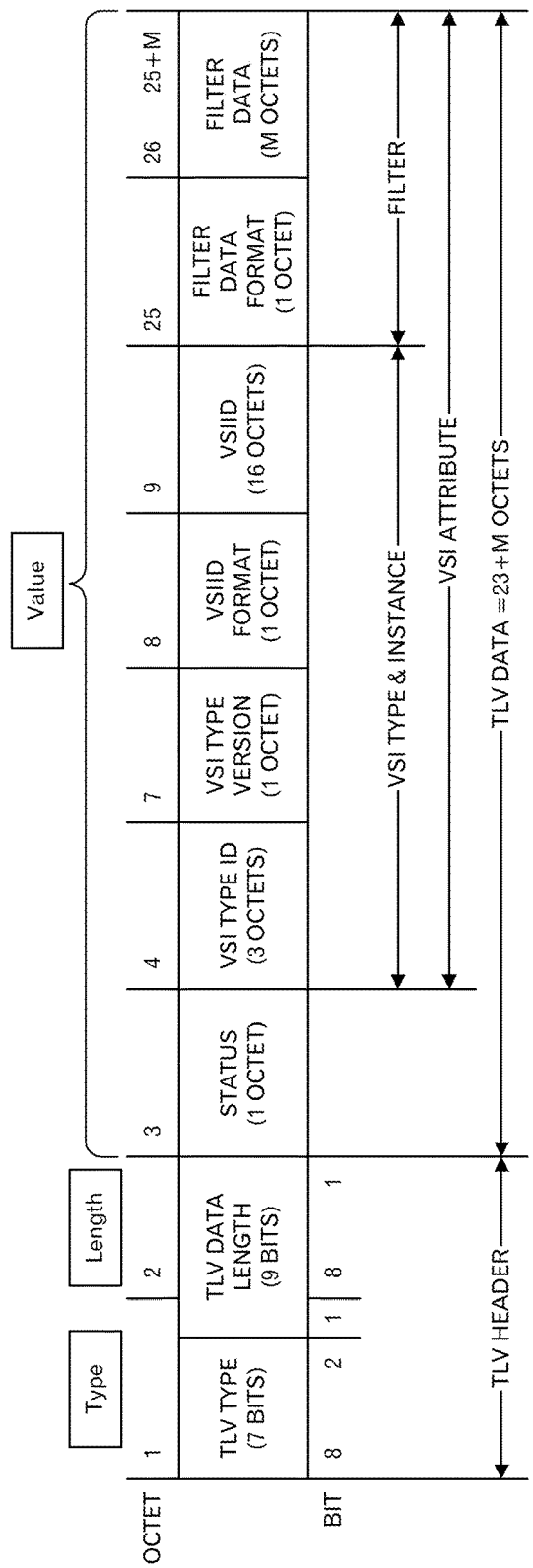

Then, FIG. 11 illustrates a format of TLV (Type, Length, Value) included in the ASSOC message and the like. A region corresponding to a TLV header includes a region of "Type" and a region of "Length". A region corresponding to TLV data includes a region of "Value". An identification code, whose size is 7 bits, for identifying the PRE-ASSOC, the PRE-ASSOC with resource reservation, the ASSOC, the DE-ASSOC, or the like is set at the region of "Type". A TLV data length whose size is 9 bits is set at the region of "Length". Data whose size is 23+M (M is a length of filter data) octets is set at the region of "Value".

A VSI type, an instance, and a filter are included in a VSI attribute, and a VSI type ID (VSI TYPE ID), a VSI type version (VSI TYPE VERSION), a VSIID format (VSIID FORMAT), and VSIID are included in the VSI type and the instance.

Data used to identify a profile are (A) the VSI TYPE ID and (B) a combination of the VSIID FORMAT and the VSIID.

In the case of (A), the VSI TYPE ID may be used because the VSI TYPE ID corresponds to an identifier (or ID) of a port profile.

In the case of (B), the VSIID FORMAT+VSIID is used to deal with a case that it is impossible to identify a port profile only by the VSI TYPE ID, for example a case of multi-tenants. Because a VSIID corresponds to an identifier of a VM, it is possible to search the profile table as FIGS. 7 and 8 even in the case of multi-tenants when data representing correspondence relationship between an identifier of a VM and a tenant ID is kept, for example. The VSIID FORMAT represents a type of a VSIID such as IPv4, IPv6, and MAC.

Then, the first application processing unit 111 determines whether or not the frame received at the step S1 is a frame which requests exclusion of application (also described as "deletion" for simplification) of a port profile (step S3). In the case of VDP, it is determined whether the frame is a DE-ASSOC message or not. When it is determined that the frame received at the step S1 is the frame which requests exclusion of application of a port profile, the processing shifts to the step S19.

On the other hand, when it is determined that the frame received at the step S1 is not the frame which requests exclusion of application of a port profile, in other words, when the frame is an ASSOC message, a PRE-ASSOC message, and a PRE-ASSOC with resource reservation message, the first application processing unit 111 searches the profile table by data of the received frame (step S7). The first application processing unit 111 searches an entry including an identifier of a port profile, which coincides with a VSI TYPE ID of the received frame or VSIID FORMAT+VSIID of the received frame.

When a pertinent entry does not exist in the profile table (step S9: No route), the processing ends. On the other hand, when the pertinent entry exists in the profile table (step S9: Yes route), the first application processing unit 111 determines whether the port profile of the pertinent entry has already been applied to a reception port (step S11). If a port number has been registered in a row of the presence or absence of port application in the profile table in FIG. 7 or FIG. 8, it can be determined immediately.

If the port profile of the pertinent entry has already been applied to the reception port, and a deletion timer has been set for the port profile of the pertinent entry in the profile table, the first application processing unit 111 resets the deletion timer (step S15). In other words, a predetermined time period is measured from the beginning again in order to deal with a case that ASSOC messages are sequentially received. Then, the processing shifts to the step S17.

On the other hand, if the port profile of the pertinent entry has not been applied to the reception port, the first application processing unit 111 applies the port profile of the pertinent entry to the reception port, and sets a deletion timer for the port profile of the pertinent entry (step S13). The port profile of the pertinent entry is read out, and is set for the reception port through, for example, the switch hardware 130. Moreover, the predetermined time period is started to be measured. Then, the processing shifts to the step S17.

Then, the first application processing unit 111 instructs the notification unit 113, and the notification unit 113 generates a registration notification which includes an identifier (or ID) of the port profile of the pertinent entry and a MLAG channel number of the reception port at which the received frame arrived, and transmits it to other switches through the switch hardware 130 (step S17). For example, the MLAG channel number is identified from a port number in the port setting table in FIG. 6. Then, the processing ends.

Moreover, at the step S19, the first application processing unit 111 searches the profile table by the data of the received frame (step S19). The step S19 is the same as the step S7. Then, when the pertinent entry does not exist in the profile table (step S21: No route), the processing ends. On the other hand, when the pertinent entry exists in the profile table (step S21: Yes route), the first application processing unit 111 sets a deletion timer for the port profile of the pertinent entry (step S23). In other words, the predetermined time period is started to be measured. Then, the processing ends.

By performing such processing, when an ASSOC message, a PRE-ASSOC message, or a PRE-ASSOC with resource reservation message is received, a port profile is applied if the port profile corresponding to the message has not been applied, and a registration notification is transmitted to other switches. Moreover, because the deletion timer is set or reset, the application of the port profile is kept while the ASSOC message as Keep-Alive or the registration notification from the other switches is received within the predetermined time period.

On the other hand, when a DE-ASSOC message is received, a deletion timer is set. However, in the case of the DE-ASSOC message, an ASSOC message is not transmitted as Keep-Alive, and application of a port profile is released after the predetermined time period has passed if the registration notification is not transmitted from other switches. In other words, a port profile set for a reception port is deleted.

Next, processing performed when a registration notification is received will be explained by using FIG. 12.

Figure 12:
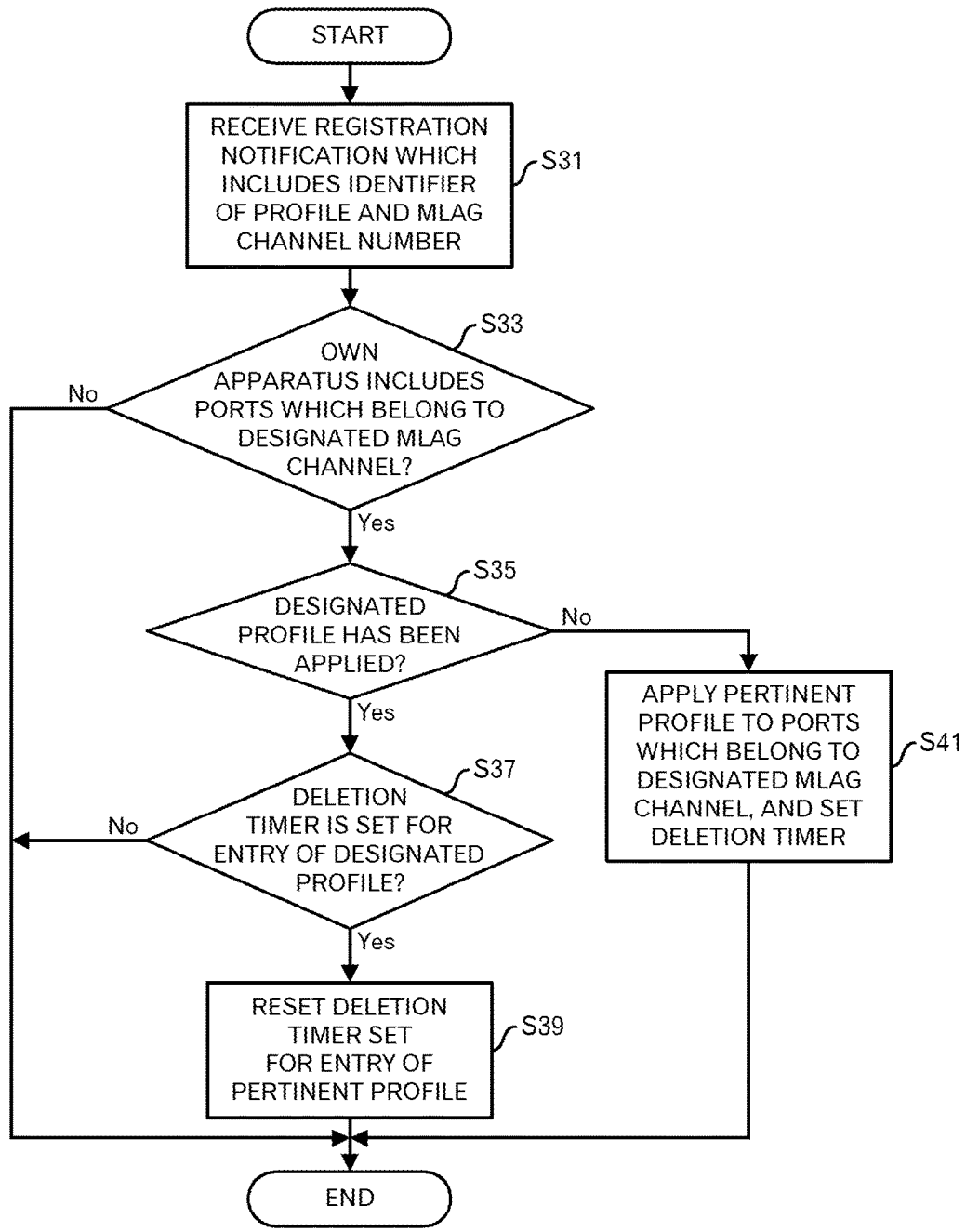
FIG. 12 is a diagram depicting the processing flow when using VDP.

The second application processing unit 112 receives an identifier (or ID) of a port profile and a registration notification which includes a MLAG channel number through one of ports and the switch hardware 130 (FIG. 12: step S31).

Then, the second application processing unit 112 determines whether the own apparatus has a port which belongs to a MLAG channel designated in the registration notification or not (step S33). For example, it is determined whether the MLAG channel number included in the registration notification has been registered in the port setting table in FIG. 6. Here, when it is determined that the port which belongs to the MLAG channel designated in the registration notification does not exist, the processing ends.

On the other hand, when it is determined that the port which belongs to the MLAG channel designated in the registration notification exists, the second application processing unit 112 determines whether a port profile designated in the registration notification has been applied to the port which belongs to the designated MLAG channel or not (step S35). If an application destination port number has been registered in a row of the presence or absence of port application in the profile table illustrated in FIG. 7 or FIG. 8, it can be easily determined.

If the port profile designated in the registration notification has not been applied to the port which belongs to the designated MLAG channel, the second application processing unit 112 applies the pertinent port profile to the port which belongs to the designated MLAG channel, and sets a deletion timer for the pertinent entry in the profile table (step S41). The port profile of the pertinent entry is read out, and is set for the port which belongs to the designated MLAG channel through, for example, the switch hardware 130. Moreover, the predetermined time period is started to be measured. Then, the processing ends.

If the port profile designated in the registration notification has been applied to the port which belongs to the designated MLAG channel, the second application processing unit 112 determines whether a deletion timer has been set for the entry of the designated port profile or not (step S37). If the deletion timer has not been set, the processing ends.

On the other hand, if the deletion timer has been set, the second application processing unit 112 resets the deletion timer set for the entry of the designated port profile in the profile table (step S39). In other words, the predetermined time period is measured from the beginning again. Then, the processing ends.

Thus, the ASSOC message and the like are transmitted to one of plural ports which belong to the same MLAG channel if MLAG setting has been performed. Therefore, when the registration notification is transmitted from a switch which has received the ASSOC message to other switches, it becomes possible to apply the same port profile to ports on the other switches which have not received the ASSOC message and the like. Although a deletion timer is set, the application of the port profile is not excluded by resetting the deletion timer each time until the ASSOC message is not received because the registration notification is transmitted whenever the ASSOC message is received.

Next, processing for management of a deletion timer and release of application of a port profile will be explained by using FIG. 13.

Figure 13:
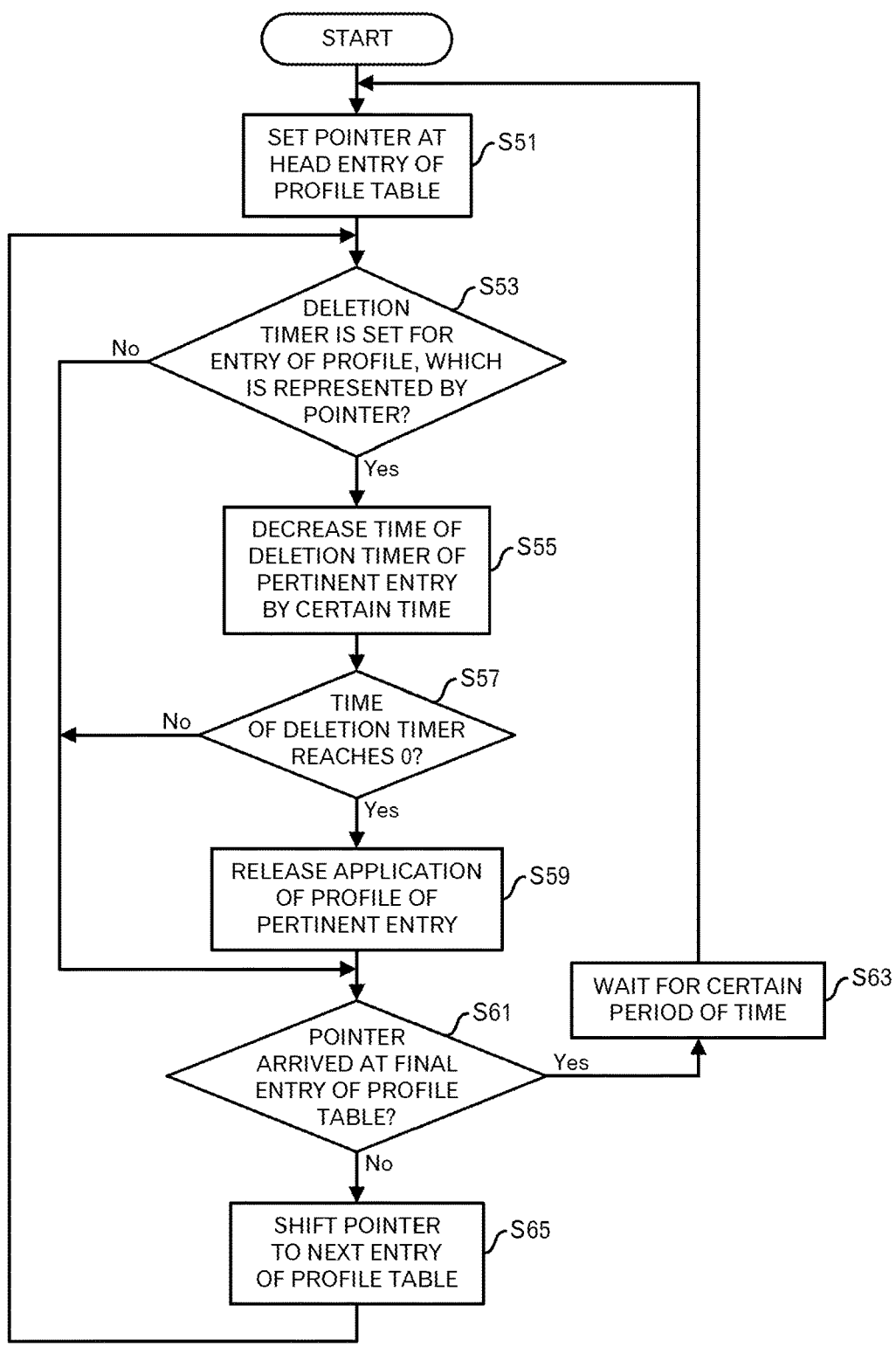
FIG. 13 is a diagram depicting the processing flow when using VDP.

The application release processing unit 114 sets a pointer at a head entry of the profile table (FIG. 13: step S51). Then, the application release processing unit 114 determines whether a deletion timer is set for the entry of the port profile, which is pointed by the pointer (step S53). If the deletion timer has not been set, the processing shifts to the step S61.

On the other hand, if the deletion timer has been set, the application release processing unit 114 decreases time of the deletion timer of the pertinent entry by a certain time (step S55). Then, the application release processing unit 114 determines whether the time of the deletion timer reaches 0 (step S57). If the time of the deletion timer has not reached 0, the processing shifts to the step S61.

On the other hand, when the time of the deletion timer has reached 0, the application release processing unit 114 sets for an application destination port through, for example, the switch hardware 130 so that application of the port profile of the pertinent entry is released (step S59). The application destination port can be easily identified if the application destination port number is registered in a row of the presence or absence of port application. The release of application is performed by, for example, deleting data of the port profile. Then, the processing shifts to the step S61.

Then, the application release processing unit 114 determines whether the pointer has arrived at a final entry of the profile table or not (step S61). When it is determined that the pointer has not arrived at the final entry of the profile table, the application release processing unit 114 shifts the pointer to a next entry of the profile table (step S65), and the processing returns to the step S53.

On the other hand, when it is determined that the pointer has arrived at the final entry of the profile table, the application release processing unit 114 waits for a certain period of time (step S63), and the processing returns to the step S51.

By repeating such processing until the switch 100 is turned off, release of application is performed for a port profile which has become unnecessary because a port to which the port profile is applied has not received the registration notification, an ASSOC message, or the like.

Figure 14A:
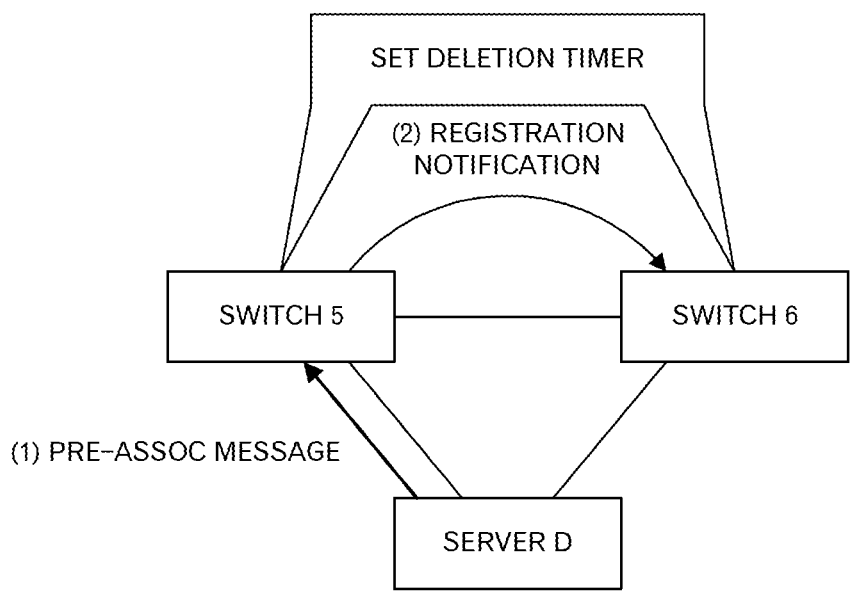
FIG. 14A is diagram for explaining operation of the switch.

By executing the processing described above, operation as illustrated in FIGS. 14A to 14C, 15A, and 15B will be performed. As illustrated in FIG. 14A, for example, when a PRE-ASSOC message is transmitted from the server D to the switch 5 (step (1)), the pertinent port profile is applied to a port for a MLAG channel for the switch 5. Moreover, a registration notification is transmitted from the switch 5 to the switch 6, and the pertinent port profile is to be applied to ports of the same MLAG channel in the switch 6. Then, a deletion timer is set for an entry of the pertinent port profile in the profile table for the switches 5 and 6.

Figure 14B:
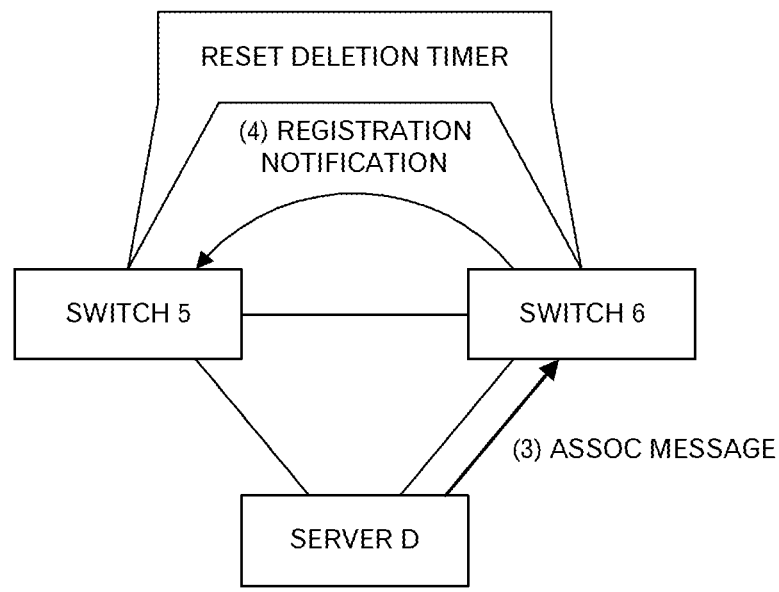
FIG. 14B is diagram for explaining operation of the switch.

Later, as illustrated in FIG. 14B, for example, when an ASSOC message is transmitted from the server D to the switch 6 (step (3)), the switch 6 transmits the registration notification to the switch 5 (step (4)). Because the pertinent port profile has already been applied to the port of the same MLAG channel, the deletion timer of the pertinent entry is reset in the profile table for the switches 5 and 6. Later, also when an ASSOC message is transmitted as Keep-Alive, the same processing as the processing in FIG. 14B is performed, and the port profile applied to the port of the same MLAG channel is not released.

Later, even when a link between the switch 5 and the server D goes down, the registration notification is transmitted to the switch 5 because the ASSOC message is transmitted from the server D to the switch 6 if a link between the switch 6 and the server D has been kept. Hence, application of the port profile is not released also in the switch 5. Thus, if the link between the switch 5 and the server D is recovered, the port profile can be used as it is because the port profile has been kept applied.

Figure 14C:
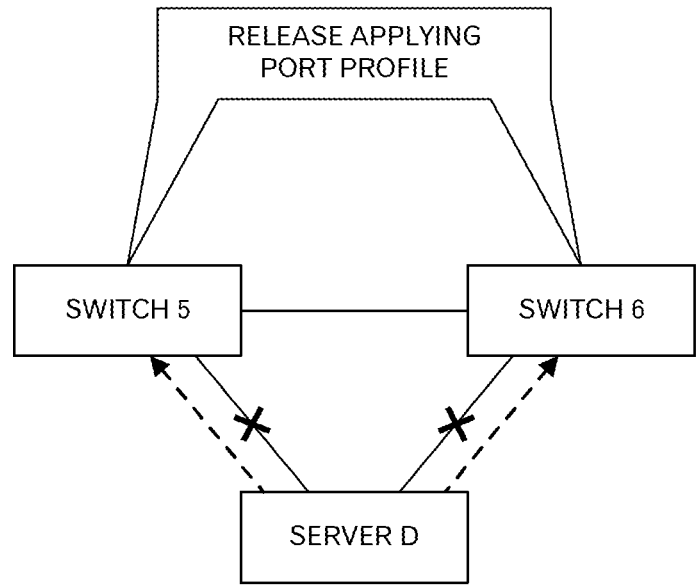
FIG. 14C is diagram for explaining operation of the switch.

On the other hand, as illustrated in FIG. 14C, when the link between the server D and the switch 5 and the link between the server D and the switch 6 go down, the ASSOC message does not arrive at the switches 5 and 6. Therefore, release of application of the port profiles is performed in both switches if the time of the deletion timer becomes 0.

Figure 15A:
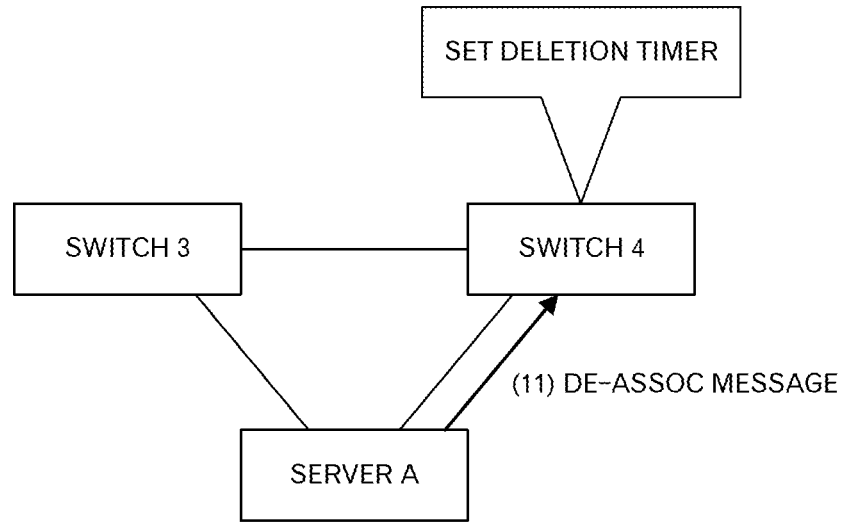
FIG. 15A is diagram for explaining operation of the switch.

Furthermore, as illustrated in FIG. 15A, when a DE-ASSOC message is transmitted from the server A to the switch 4 (step (11)), a deletion timer of the pertinent entry in the profile table is set. If a deletion timer has been set for the switch 3, the time of the deletion timer approaches 0 as it is because the switch 3 does not receive the registration notification and an ASSOC message as it is.

Figure 15B:
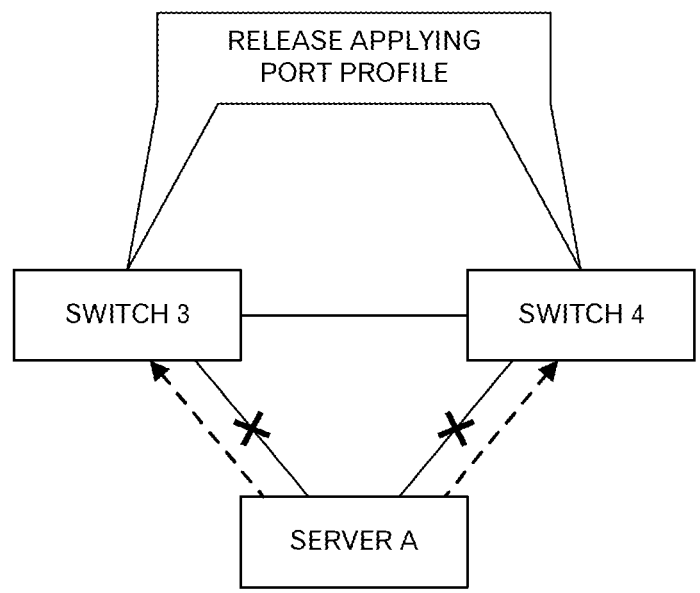
FIG. 15B is diagram for explaining operation of the switch.

Later, as illustrated in FIG. 15B, because the registration notification and the ASSOC message do not arrived at the switches 3 and 4, the time of the deletion timer in the pertinent entry in the profile table reaches 0 and release of application of the port profile is performed. Therefore, if a VM which operates on the server A disappears and other VMs for a VLAN to which the disappeared VM belongs do not exist, a frame for the VLAN to which the disappeared VM belongs is to be discarded at a port which is set as MLAG for the server A in the switches 3 and 4.

Embodiment for ARP

In the case that VDP is not used, for example, except for the steps S105 to 109 in FIG. 2, an ARP (Address Resolution Protocol) frame or a RARP (Reverse ARP) frame is sometimes broadcasted from the migrated VM after the step S111 when live migration of a VM is performed as FIG. 2. In such case, setting of a port profile is performed by using this ARP frame and the like.

In the case of VDP, because the ASSOC message and the like are transmitted to a switch connected to a server, the ASSOC message and the like are received by an outer port in the switch side. On the other hand, because the ARP message and the like are messages which are broadcasted, each switch 100 physically performs broadcast processing in the switch hardware 130, and the switch hardware 130 simultaneously outputs the ARP frame and the like to the controller 110.

Figure 16:
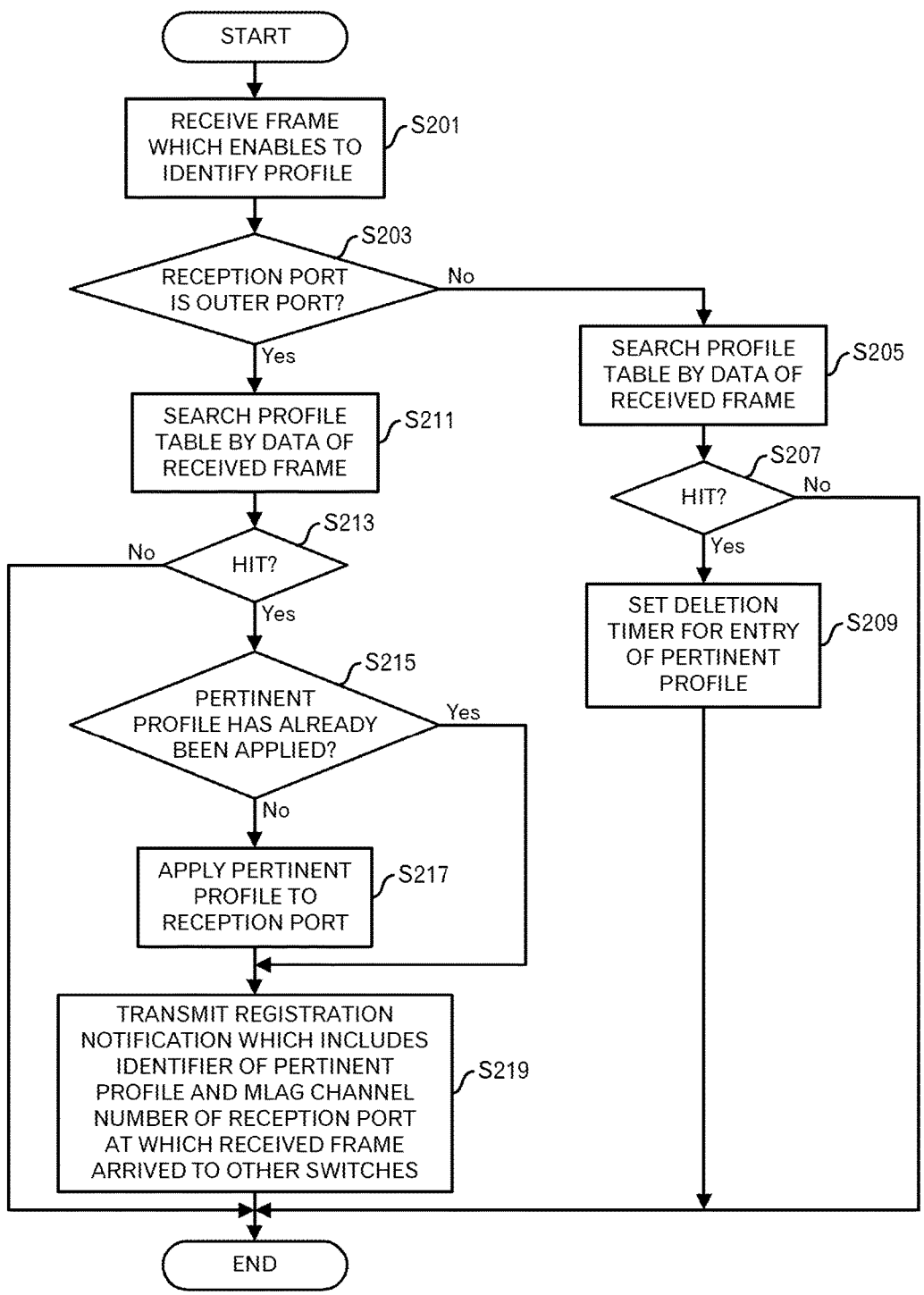
FIG. 16 is a diagram depicting a processing flow when using an ARP frame.
Figure 17:
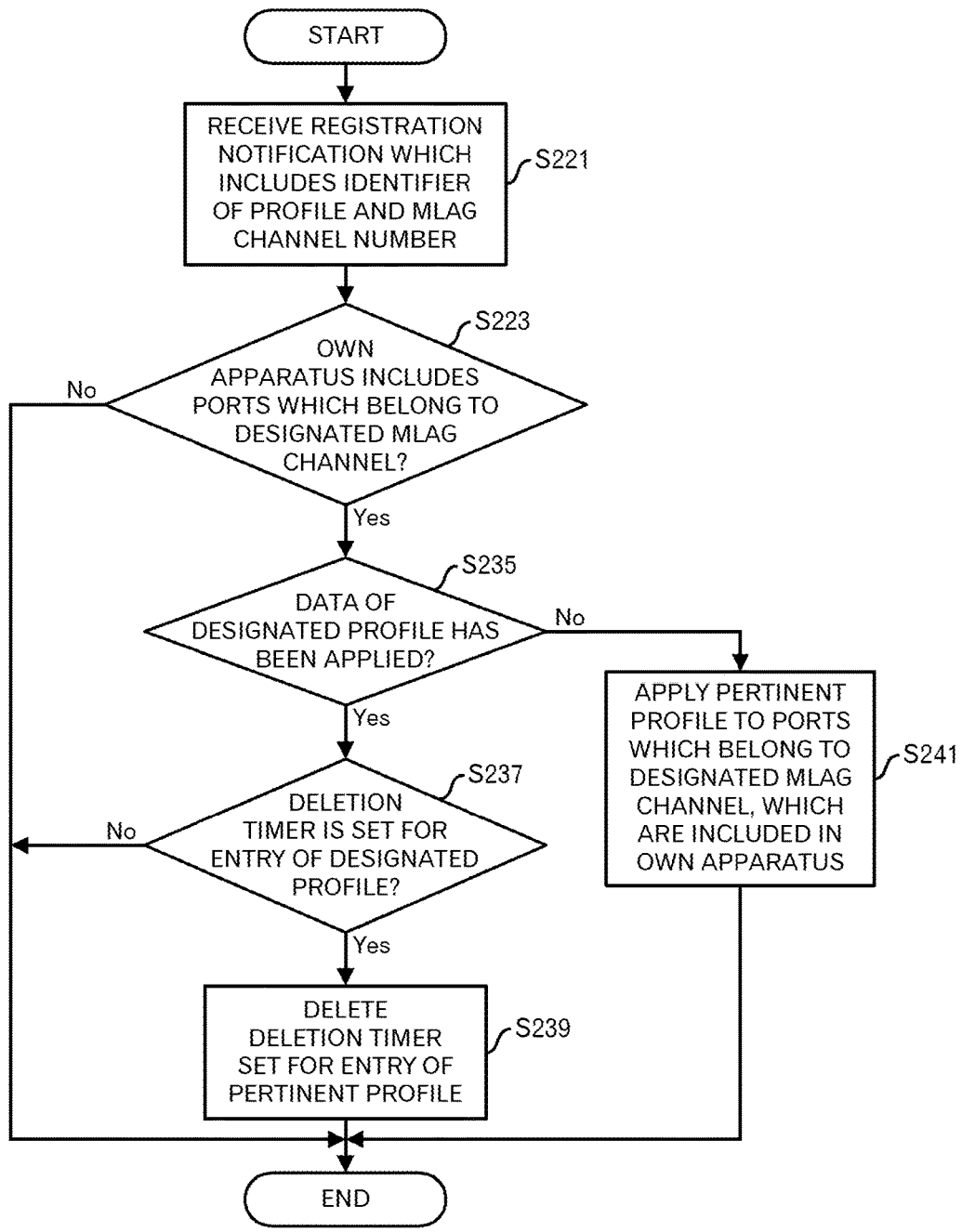
FIG. 17 is a diagram depicting the processing flow when using the ARP frame.

Then, when the controller 110 receives the ARP frame and the like, the processing in FIGS. 16 and 17 is performed.

First, the first application processing unit 111 included in the controller 110 receives a frame which enables to identify a profile through one of ports and the switch hardware 130 (FIG. 16: step S201).

Here, as described above, an ARP frame and a RARP frame are considered as the frame which enables to identify a profile, and a transmission source MAC address is used as an identifier of a port profile.

Then, the first application processing unit 111 determines whether a reception port of the frame received at the step S201 is an outer port or not (step S203). For example, a port type is identified based on data as illustrated in FIG. 6. When the reception port is not an outer port, the processing shifts to the step S205.

On the other hand, when the reception port is an outer port, the first application processing unit 111 searches the profile table by data of the received frame (step S211). The first application processing unit 111 searches for an entry which includes an identifier of the port profile, which coincides with the transmission source MAC address of the received frame.

When the pertinent entry does not exist in the profile table (step S213: No route), the processing ends. On the other hand, when the pertinent entry exists in the profile table (step 5213: Yes route), the first application processing unit 111 determines whether the port profile of the pertinent entry has already been applied to the reception port (step S215). If a port number has been registered in a row of the presence or absence of port application in the profile table in FIG. 7 or FIG. 8, it is possible to determine immediately.

When it is determined that the port profile of the pertinent entry has already been applied to the reception port, the processing shifts to the step S219.

On the other hand, when it is determined that the port profile of the pertinent entry has not been applied to the reception port, the first application processing unit 111 applies the port profile of the pertinent entry to the reception port (step S217). The port profile of the pertinent entry is read out, and is set for the reception port through, for example, the switch hardware 130. Then, the processing shifts to the step S219.

Then, the first application processing unit 111 instructs the notification unit 113, and the notification unit 113 generates a registration notification which includes the identifier of the port profile of the pertinent entry and a MLAG channel number of the reception port at which the received frame arrived, and transmits it to other switches through the switch hardware 130 (step S219). For example, the MLAG channel number is identified from the port number in the port setting table in FIG. 6. Then, the processing ends.

Moreover, the first application processing unit 111 searches the profile tale by data of the received frame at the step S205 (step S205). The step S205 is the same as the step 5211. Then, when the pertinent entry does not exist in the profile table (step S207: No route), the processing ends. On the other hand, when the pertinent entry exists in the profile table (step 5207: Yes route), the first application processing unit 111 sets a deletion timer for the port profile of the pertinent entry (step S209). In other words, the predetermined time period is started to be measured. Then, the processing ends.

By performing such processing, when an ARP frame or a RARP frame is received through an outer port, a port profile is applied to a reception port if the port profile has not been applied to the reception port. Moreover, the registration notification is transmitted to other switches regardless of presence or absence of application.

Next, processing performed when a registration notification is received will be explained by using FIG. 17.

The second application processing unit 112 receives an identifier (or ID) of a port profile and a registration notification which includes a MLAG channel number through one of ports and the switch hardware 130 (FIG. 17: step S221).

Then, the second application processing unit 112 determines whether the own apparatus includes a port which belongs to the MLAG channel designated in the registration notification or not (step S223). For example, it is determined whether the MLAG channel number included in the registration notification has been registered, for example, in the table in FIG. 6. Here, when it is determined that the port which belongs to the MLAG channel designated in the registration notification does not exist, the processing ends.

On the other hand, when it is determined that the port which belongs to the MLAG channel designated in the registration notification exists, the second application processing unit 112 determines whether or not the port profile designated in the registration notification has been applied to the port which belongs to the designated MLAG channel (step S235). If an application destination port number has been registered in a row of the presence or absence of port application in the profile table illustrated in FIG. 7 or in FIG. 8, it can be easily determined.

When it is determined that the port profile designated in the registration notification has not been applied to the port which belongs to the designated MLAG channel, the second application processing unit 112 applies the pertinent port profile to the port which belongs to the designated MLAG channel (step S241). The port profile of the pertinent entry is read out, and is set for the port which belongs to the designated MLAG channel through, for example, the switch hardware 130. If a deletion timer has been set, the deletion timer is deleted. Then, the processing ends.

When it is determined that the port profile designated in the registration notification has already been applied to the port which belongs to the designated MLAG channel, the second application processing unit 112 determines whether a deletion timer has been set for the entry of the designated port profile in the profile table or not (step S237). If the deletion timer has not been set, the processing ends.

On the other hand, if the deletion timer has been set, the second application processing unit 112 deletes the deletion timer set for the entry of the designated port profile in the profile table (step S239). In other words, it stops to measure the predetermined time period. Then, the processing ends.

By performing such processing, when an ARP frame is broadcasted through an inner port, a port profile is not applied, but a deletion timer is set. However, the deletion timer does not effectively operate because the port profile is not applied. Later, when a registration notification reaches, the port profile is set for a port which belongs to the same MLAG channel.

Because processing for release of application of a port profile, which is illustrated in FIG. 13, is the same as the processing in the first embodiment, explanation of the processing for release of application of a port profile is omitted.

Figure 18A:
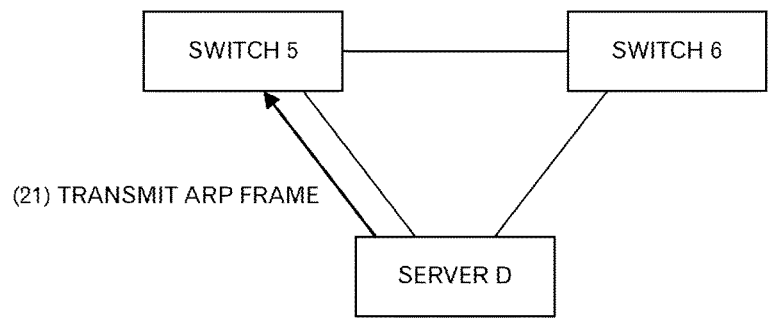
FIG. 18A is diagram for explaining operation of the switch when using the ARP frame.
Figure 18B:
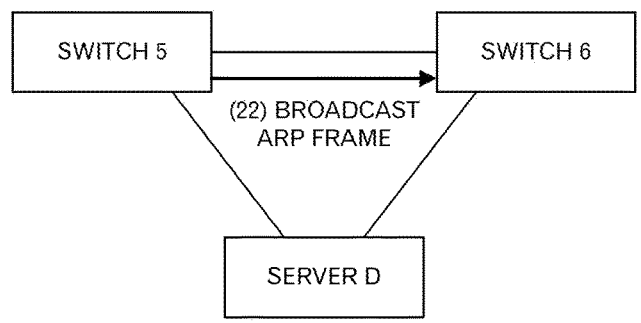
FIG. 18B is diagram for explaining operation of the switch when using the ARP frame.

Next, operation of a switch in the second embodiment will be explained by using FIGS. 18A to 19. First, as illustrated in FIG. 18A, when a VM on the server D transmits an ARP frame to, for example, the switch 5 (step (21)), the switch 5 performs processing for applying a port profile to a reception port. Later, as illustrated in FIG. 18B, the switch 5 broadcasts ARP frames to the switch 6 (step (22)). The switch 6 set a deletion timer at this time, but there is no practical effect because a port profile is not applied to a port of the same MLAG channel.

Figure 18C:
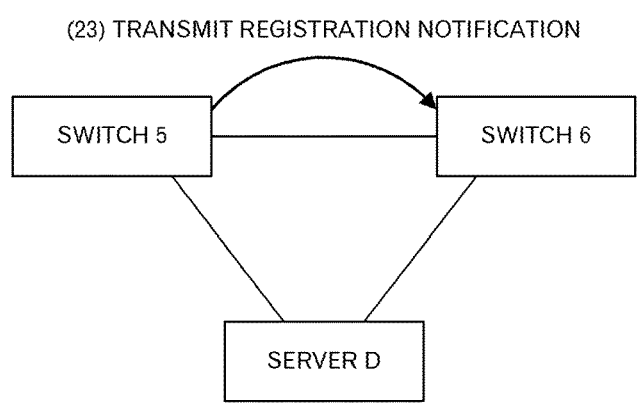
FIG. 18C is diagram for explaining operation of the switch when using the ARP frame.

Because broadcast of the ARP frame is quickly performed in the switch hardware 130 as described above, a registration notification is transmitted from the switch 5 to the switch 6 later as illustrated in FIG. 18C. In the switch 6, the port profile is applied to the port of the same MLAG channel according to the registration notification. When the deletion timer operates, the deletion timer is deleted.

Figure 18D:
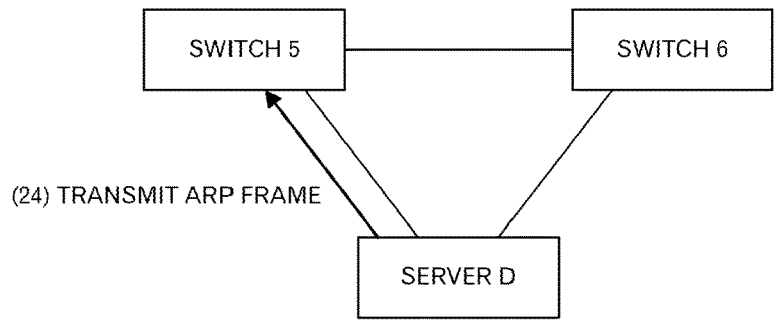
FIG. 18D is a diagram for explaining operation of the switch when using the ARP frame.
Figure 18E:
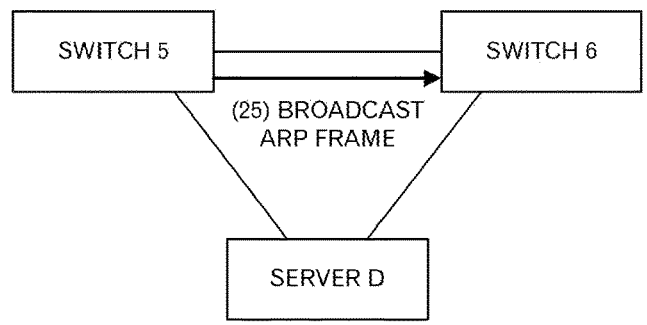
FIG. 18E is a diagram for explaining operation of the switch when using the ARP frame.

Later, as illustrated in FIG. 18D, when the ARP frame is transmitted from the VM on the server D again (step (24)), the switch 5 particularly does nothing, and the ARP frame is broadcasted as illustrated in FIG. 18E (step (25)). When the ARP frame arrives at the switch 6 through an inner port, a deletion timer is set. Although having received an ARP frame from not an external switch but an internal switch enables to assume that a VM has migrated. However, because there's a possibility that the ARP frame has arrived at another switch including a port of the same MLAG channel, the port profile is not immediately deleted, and the switch 6 waits arrival of the registration notification for a predetermined time period.

Figure 18F:
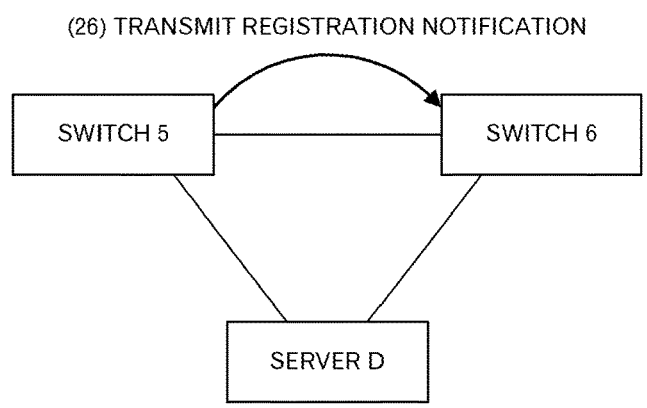
FIG. 18F is a diagram for explaining operation of the switch when using the ARP frame.

Later, as illustrated in FIG. 18F, the registration notification is transmitted from the switch 5 to the switch 6 (step (26)). Then, the deletion timer is deleted in the switch 6. Then, processing using the port profile is performed as it is without releasing application of the port profile applied to the port of the same MLAG channel. Thus, there is no problem because a deletion timer is deleted in another switch if the registration notification is always transmitted in response to reception of the ARP frame through an outer port.

When the ARP frame arrives from another switch which does not relate to the MLAG channel, the port profile can be deleted by the deletion timer if the port profile has already been applied. Thus, it is possible to deal with the case that a VM has migrated by live migration and has disappeared.

Figure 4:
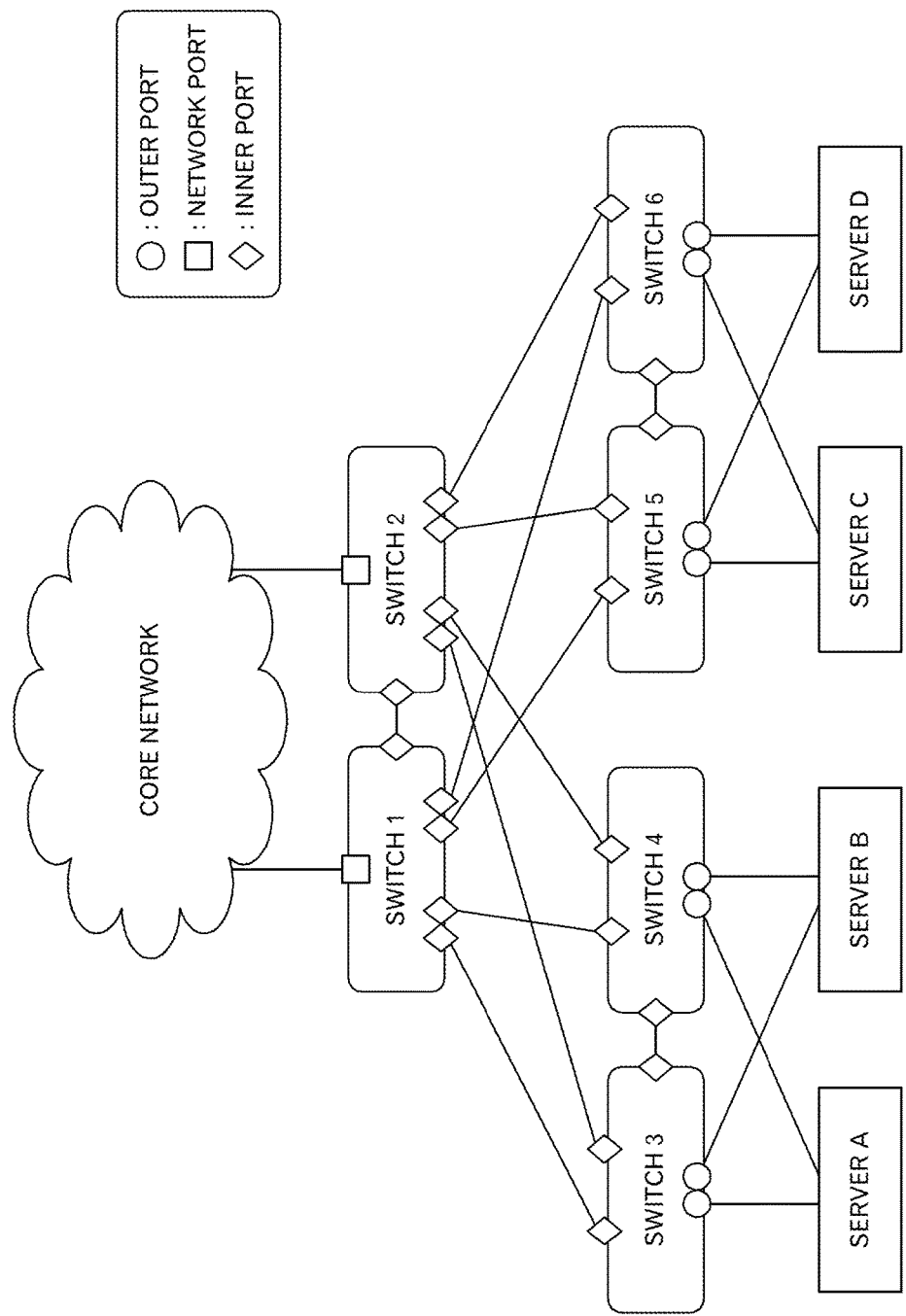
FIG. 4 is a diagram depicting an example of network configuration relating to an embodiment.

Furthermore, as illustrated in FIG. 4, even in cascaded switches, proper operation is performed because a switch which includes outer ports interrupts an improper frame and allows a proper frame to pass.

Figure 19:
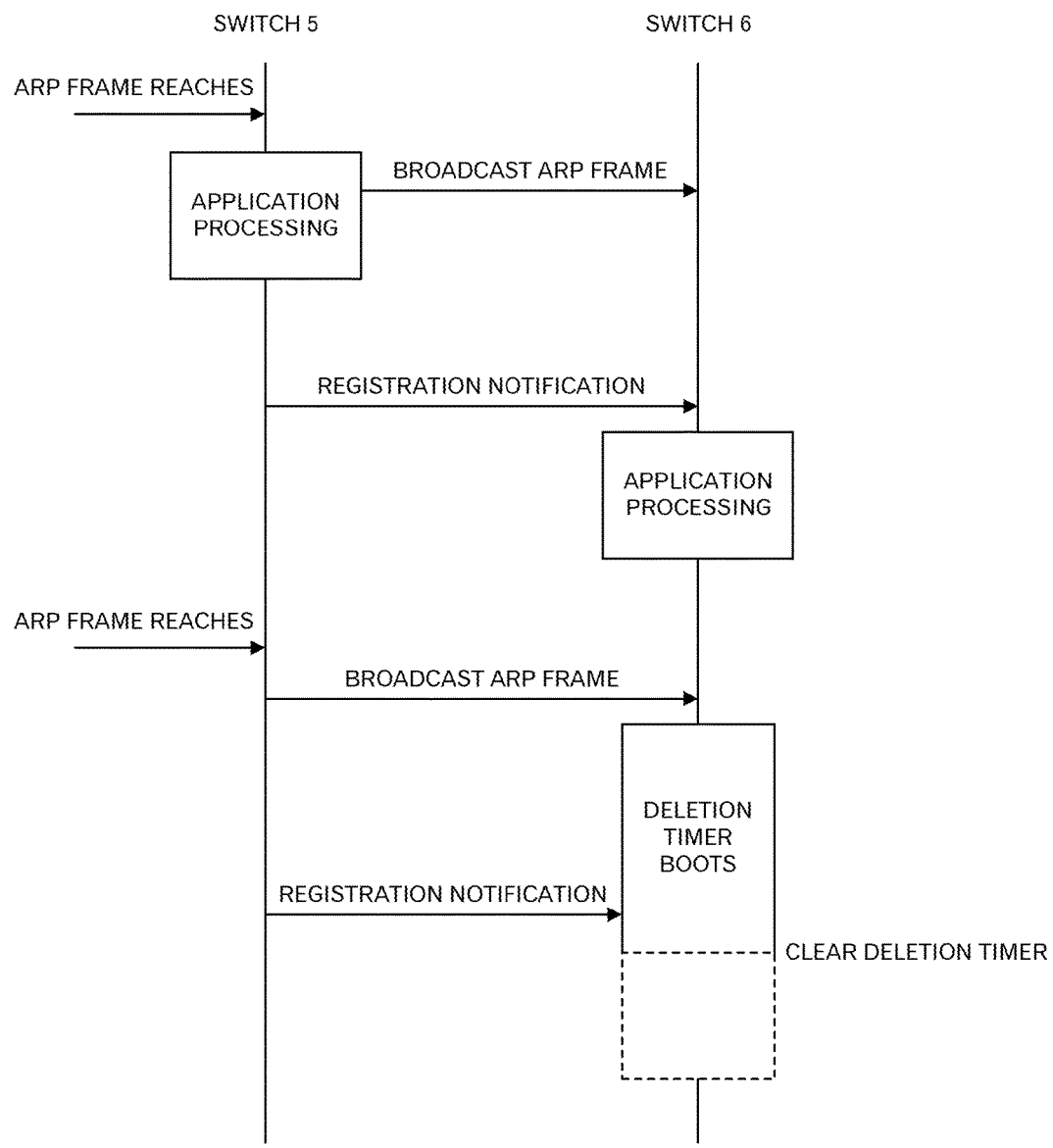
FIG. 19 is a diagram for explaining operation of the switch when using the ARP frame.

When operation illustrated in FIGS. 18A to 18F is represented in a different method, operation as illustrated in FIG. 19 is obtained. Assume that time passes from the top in FIG. 19. When an ARP frame arrives at the switch 5 at first, processing for application of a port profile is performed in the switch 5. However, the ARP frame is broadcasted from the switch 5 to the switch 6 through the switch hardware 130. Because an inner port receives the ARP frame in the switch 6, processing for application is not performed in the switch 6. In the switch 5, a registration notification is transmitted from the switch 5 to the switch 6 after processing for application of a port profile is performed. Processing for application of aport profile is performed in the switch 6 according to the registration notification.

Later, when the ARP frame is transmitted from the same VM to the switch 5 again, the switch hardware 130 included in the switch 5 broadcasts the ARP frame. Then, because the ARP frame arrives at the switch 6, a deletion timer is set, and the predetermined time period is started to be measured. However, although the switch 5 does not perform processing for application, the switch 6 clears the deletion timer at this time because the registration notification is transmitted to the switch 6. Therefore, the application of the port profile is not released.

When the registration notification for the same MLAG channel does not arrive, the application of the port profile is released in the switch 6 at the time when the deletion timer reaches 0.

Although the embodiments of this technique were explained above, this technique is not limited to those. For example, the network configuration illustrated in FIG. 4 is an example, and another network configuration is also applicable if MLAG is set between a server and a switch. Furthermore, the functional block diagram of a switch, which is illustrated in FIG. 5, is an example, and the configuration in the functional block diagram does not always correspond to program module configuration.

As for the processing flow, as long as the processing results do not change, the turns of the steps may be exchanged or the steps may be executed in parallel.

Figure 20:
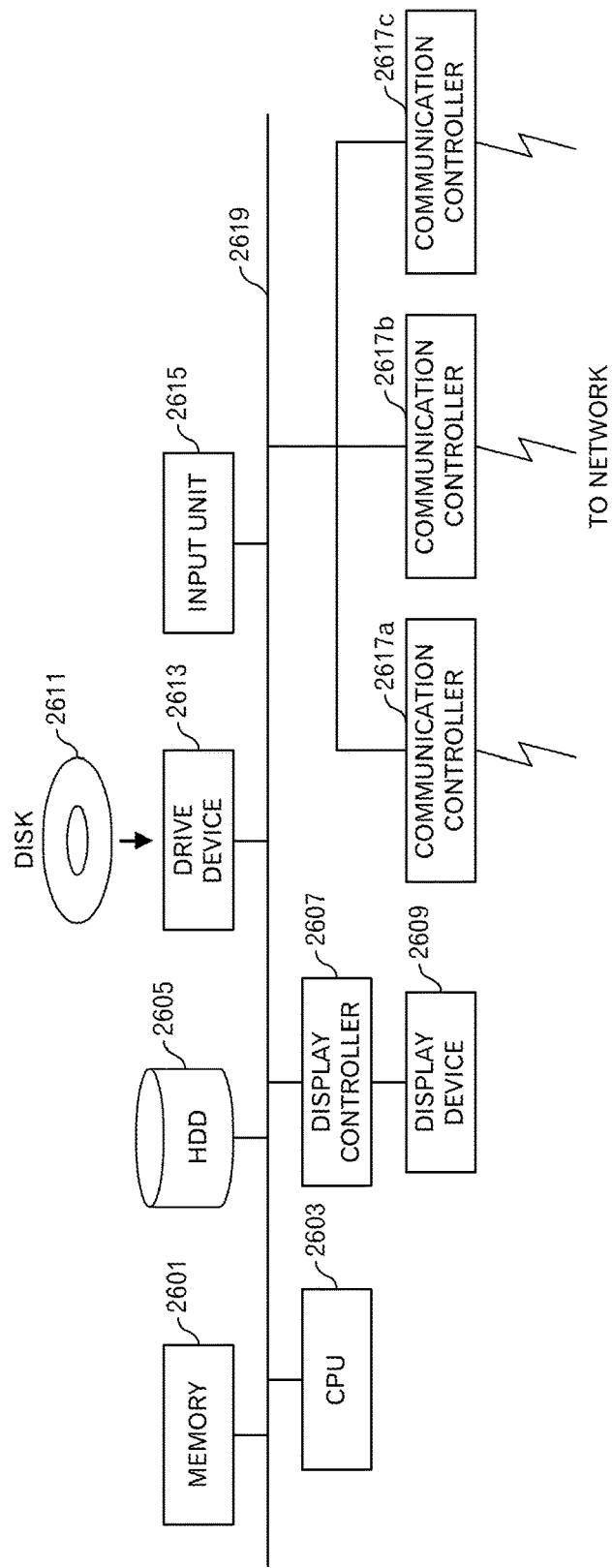
FIG. 20 is a functional block diagram representing a case that a switch is implemented by a computer.

In addition, the aforementioned switch 100 is computer device as illustrated in FIG. 20, a memory 2601, CPU 2603, Hard Disk Drive (HDD) 2605, display controller 2607 to be coupled with a display device 2609, drive device 2613 for a removable disk 2611, input unit 2615 and communication controllers 2617 (2617a to 2617c in FIG. 20) for coupling to a network may be coupled with a bus 2619. Incidentally, according to circumstances, the display controller 2607, display device 2609, drive device 2613 and input unit 2615 may not be included. The OS and application programs for carrying out a processing in these embodiments are stored in the HDD 2605, and read out from the HDD 2605 to the memory 2601 when being executed by the CPU 2603. If necessary, the CPU 2603 controls the display controller 2607, communication controllers 2617 and drive device 2613 to carry out necessary operations. Incidentally, data that was inputted through any one of the communication controllers 2617 is outputted through another communication controller 2617. The CPU 2603 controls the communication controllers 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613. The programs may be installed into the HDD 2605 through the communication controllers 2617 and the network such as the Internet. Such a computer apparatus realizes the aforementioned various functions by cooperating the hardware such as the CPU 2603, memory 2601 and the like with the OS and the application programs if necessary.

The aforementioned embodiment is summarized as follows:

A switch relating to this embodiment includes: plural ports; a first application unit that applies profile data associated with identification data to a first port of the plural ports, upon receiving a predetermined message through a first link in a situation that another apparatus connected to the first port through the first link is connected to another switch through a second link and the first link and the second link are virtually integrated, wherein the predetermined message includes the identification data of profile data relating to the another apparatus; a notification unit that generates a first registration notification that includes a first identifier of the profile data and a second identifier for identifying the first link and the second link which are virtually integrated, and transmits the first registration notification to at least the another switch, upon receiving the predetermined message; and a second application unit that applies profile data associated with a third identifier to the first port when the profile data associated with the third identifier has not been applied to the first port, upon receiving a second registration notification, which includes the third identifier of the profile data and the second identifier for identifying the first link and the second link which are virtually integrated, from the another switch.

Thus, even though MLAG has been set, it becomes possible to automatically apply port profile according to live migration of a VM or the like.

Moreover, the predetermined message may be a message broadcasted in order to obtain addresses of other apparatuses, and the identification data may be a transmission source address of the predetermined message. And the first application unit may suspend release of application of the profile data associated with the identification data for a predetermined time period, upon receiving a second predetermined message that includes the identification data of profile data relating to the another apparatus from a port other than the first port of the plural ports, and may release the application of the profile data associated with the identification data, upon not receiving the first registration notification that includes the first identifier and the second identifier within the predetermined time period.

Thus, it becomes possible to perform release of application of the profile data properly in a switch and the like connected to a migration source server of a VM, for example.

Moreover, the profile data associated with the another apparatus may be kept applied upon receiving the first registration notification that includes the first identifier and the second identifier within the predetermined time period. Because a predetermined frame arrives at the switch that has ports whose MLAG channel is the same and the switch receives the first registration notification, it is good to keep application of the profile data.

Furthermore, the predetermined message may be a first notification transmitted with respect to activation of a virtual machine or a physical machine and a second notification for confirmation of a state may be transmitted, from another apparatus, with respect to the first notification. And the first application unit may set a predetermined grace period in association with the profile data associated with the identification data, and may reset measurement of the predetermined grace period, upon receiving the second notification. Thus, it becomes possible to deal with link-down and the like properly. In other words, if it is possible to receive the second notification during the grace period, the profile data can be kept applied because it is not entire link-down.

Moreover, the second application unit may reset measurement of the predetermined grace period, upon receiving the first registration notification that includes the first identifier and the second identifier from the another switch. Even though the switch itself does not receive the second notification, if the switch received the first registration notification from a switch including ports whose MLAG channel is the same, it is good to keep application of profile data. On the other hand, when the switch does not receive the second notification and first registration notification, it is considered that link of all port of MLAG channel went down. Therefore, application of the port profile is to be released.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a RAM or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch, comprising:
a plurality of ports;
a memory; and
a processor configured to use the memory and execute a process, the process comprising:
first applying profile data associated with identification data to a first port of the plurality of ports, upon receiving a predetermined message through a first link in a situation that another apparatus connected to the first port through the first link is connected to another switch through a second link and the first link and the second link are virtually integrated, wherein the predetermined message includes the identification data of profile data relating to the another apparatus;
generating a first registration notification that includes a first identifier of the profile data and a second identifier for identifying the first link and the second link which are virtually integrated, upon receiving the predetermined message;
transmitting the first registration notification to at least the another switch; and
second applying profile data associated with a third identifier to the first port when the profile data associated with the third identifier has not been applied to the first port, upon receiving a second registration notification, which includes the third identifier of the profile data and the second identifier for identifying the first link and the second link which are virtually integrated, from the another switch.

2. The switch as set forth in claim 1, wherein the predetermined message is a message broadcasted in order to obtain addresses of other apparatuses, the identification data is a transmission source address of the predetermined message, and
the first applying comprises:
suspending release of application of the profile data associated with the identification data for a predetermined time period, upon receiving a second predetermined message that includes the identification data of profile data relating to the another apparatus from a port other than the first port of the plurality of the ports; and
releasing the application of the profile data associated with the identification data, upon not receiving the first registration notification that includes the first identifier and the second identifier within the predetermined time period.

3. The switch as set forth in claim 2, wherein the profile data associated with the another apparatus data is kept applied upon receiving the first registration notification that includes the first identifier and the second identifier within the predetermined time period.

4. The switch as set forth in claim 1, wherein the predetermined message is a first notification transmitted with respect to activation of a virtual machine or a physical machine, a second notification for confirmation of a state is transmitted, from the another apparatus, with respect to the first notification, and
the first applying comprises:
setting a predetermined grace period in association with the profile data associated with the identification data; and
resetting measurement of the predetermined grace period, upon receiving the second notification.

5. The switch as set forth in claim 4, wherein the second applying comprises:
resetting measurement of the predetermined grace period, upon receiving the first registration notification that includes the first identifier and the second identifier from the another switch.

6. A non-transitory computer-readable storage medium storing a program for causing a computer to execute a process, the process comprising:
first applying profile data associated with identification data to a first port of a plurality of ports, upon receiving a predetermined message through a first link in a situation that another apparatus connected to the first port through the first link is connected to another switch through a second link and the first link and the second link are virtually integrated, wherein the predetermined message includes the identification data of profile data relating to the another apparatus;
generating a first registration notification that includes a first identifier of the profile data and a second identifier for identifying the first link and the second link which are virtually integrated, upon receiving the predetermined message;
transmitting the first registration notification to at least the another switch; and
second applying profile data associated with a third identifier to the first port when the profile data associated with the third identifier has not been applied to the first port, upon receiving a second registration notification, which includes the third identifier of the profile data and the second identifier for identifying the first link and the second link which are virtually integrated, from the another switch.

7. A setting method, comprising:
first applying, by a processor, profile data associated with identification data to a first port of a plurality of ports, upon receiving a predetermined message through a first link in a situation that another apparatus connected to the first port through the first link is connected to another switch through a second link and the first link and the second link are virtually integrated, wherein the predetermined message includes the identification data of profile data relating to the another apparatus;
generating, by the processor, a first registration notification that includes a first identifier of the profile data and a second identifier for identifying the first link and the second link which are virtually integrated, upon receiving the predetermined message;
transmitting, by the processor, the first registration notification to at least the another switch; and
second applying, by the processor, profile data associated with a third identifier to the first port when the profile data associated with the third identifier has not been applied to the first port, upon receiving a second registration notification, which includes the third identifier of the profile data and the second identifier for identifying the first link and the second link which are virtually integrated, from the another switch.

* * * * *